US008717886B2

(12) United States Patent
Yamamoto

(10) Patent No.: US 8,717,886 B2
(45) Date of Patent: May 6, 2014

(54) COMMUNICATION DEVICE AND METHOD OF MANAGING COMMUNICATION RESOURCES

(75) Inventor: Takaya Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1182 days.

(21) Appl. No.: 12/633,936

(22) Filed: Dec. 9, 2009

(65) Prior Publication Data

US 2010/0085906 A1   Apr. 8, 2010

Related U.S. Application Data

(63) Continuation of application No. PCT/JP2007/000620, filed on Jun. 12, 2007.

(51) Int. Cl.
*H04L 12/26* (2006.01)
*H04W 72/00* (2009.01)

(52) U.S. Cl.
USPC ......... 370/230; 709/226; 455/453; 455/452.2

(58) Field of Classification Search
USPC ............... 370/230; 709/226; 455/453, 452.2
See application file for complete search history.

(56) References Cited

U.S. PATENT DOCUMENTS

| 5,887,136 | A | 3/1999 | Yasuda et al. |
| 6,523,696 | B1 | 2/2003 | Saito et al. |
| 6,751,221 | B1 | 6/2004 | Saito et al. |
| 7,383,341 | B1 | 6/2008 | Saito et al. |
| 2002/0199200 | A1* | 12/2002 | Addington ............ 725/97 |
| 2003/0084191 | A1 | 5/2003 | Yamamoto |
| 2003/0153325 | A1* | 8/2003 | Veerepalli et al. ...... 455/453 |
| 2004/0196853 | A1 | 10/2004 | Saito et al. |
| 2005/0188405 | A1 | 8/2005 | Lee et al. |
| 2005/0207340 | A1* | 9/2005 | O'Neill ............... 370/230 |
| 2008/0155101 | A1* | 6/2008 | Welsh et al. ......... 709/226 |

FOREIGN PATENT DOCUMENTS

| JP | 9-50380 | 2/1997 |
| JP | 10-308759 | 11/1998 |
| JP | 11-225169 | 8/1999 |
| JP | 2001-94519 | 4/2001 |
| JP | 2002-9824 | 1/2002 |
| JP | 2002-57721 | 2/2002 |
| JP | 2002-237844 | 8/2002 |
| JP | 2002-354450 | 12/2002 |
| JP | 2003-204355 | 7/2003 |
| JP | 2005-229580 | 8/2005 |

(Continued)

OTHER PUBLICATIONS

Notice of Rejection Ground dated Feb. 15, 2011, from the corresponding Japanese Application.

(Continued)

*Primary Examiner* — Ariel Balaoing
(74) *Attorney, Agent, or Firm* — Katten Muchin Rosenman LLP

(57) ABSTRACT

In response to a resource acquisition request received from a terminal device, whether or not there is an available communication resource among a plurality of communication resources used for receiving or transmitting broadcast signals is checked. When those communication resources are being used and there is not an available communication resource, that resource acquisition request is held temporarily, and release of a communication resource being used is waited for. When a communication resource that has ceased to be used is released, the released communication resource is allocated to the resource acquisition request that has been held.

8 Claims, 32 Drawing Sheets

(56) References Cited

FOREIGN PATENT DOCUMENTS

| JP | 2006-166317 | 6/2006 |
|---|---|---|
| JP | 2007-43310 | 2/2007 |
| WO | 2006/101179 | 9/2006 |

OTHER PUBLICATIONS

International Search Report dated Aug. 21, 2007, from the corresponding International Application.
W. Fenner. "Internet Group Management Protocol, Version 2, IGMP Version 2" Network Working Group, Request for Comments: 2236, Nov. 1997, retrieved from http://www.geocities.jp/kotekoteland/rfc/rfc2236j.txt.
"Information technology—Generic coding of moving pictures and associated audio information: Systems" International Standard, ISO/IEC 13818-1, Dec. 1, 2000.
"Series H: Audiovisual and Multimedia Systems, Infrastructure of audiovisual services—Transmission multiplexing and Synchronization" International Telecommunication Union, ITU-T, H.222.0 Amendment 3, Mar. 2004.
S. Deering. "Host Extensions for IP Multicasting" Network Working Group, Request for Comments: 1112, Aug. 1989.
S. Deering, et al. "Multicast Listener Discovery (MLD) for IPv6" Network Working Group, Request for Comments: 2710, Oct. 1999.
R. Braden, et al. "Resource ReSerVation Protocol (RSVP)—Version 1 Functional Specification" Network Working Group, Request for Comments: 2205, Sep. 1997.

* cited by examiner

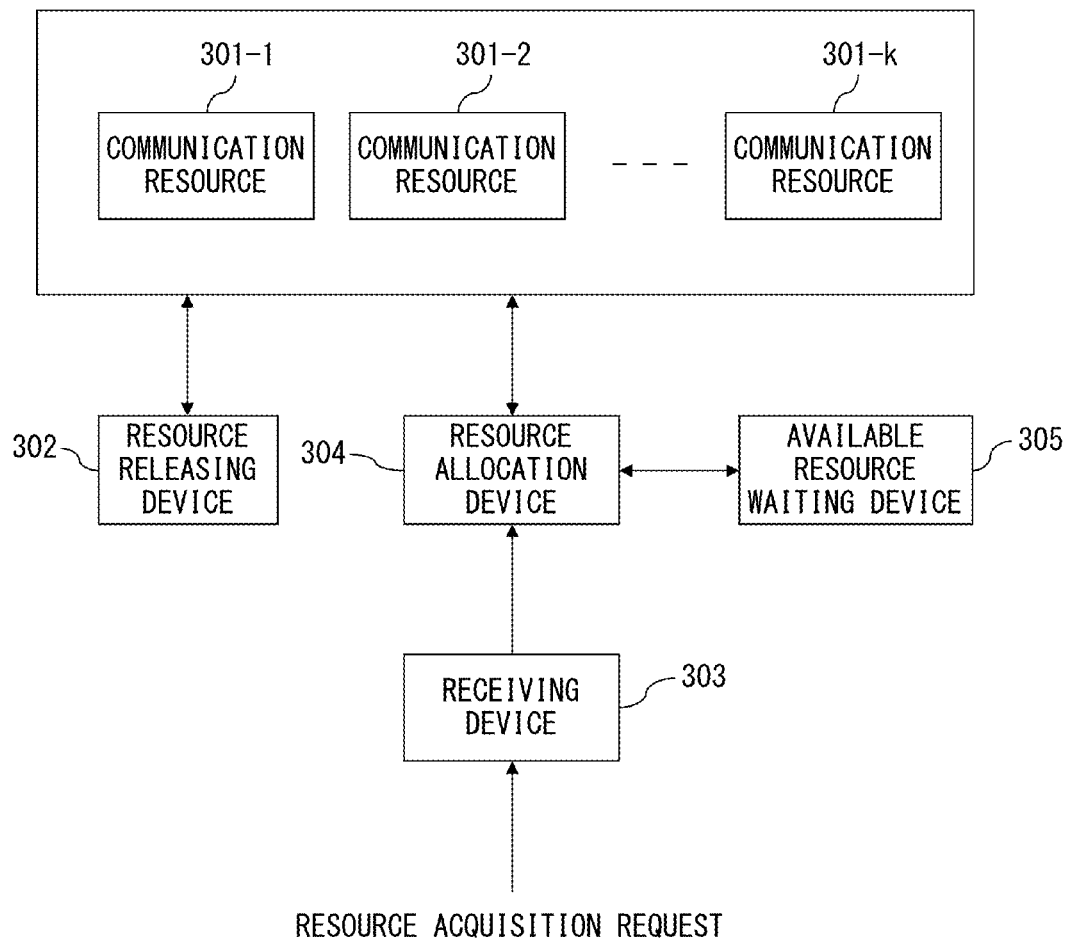
F I G. 13

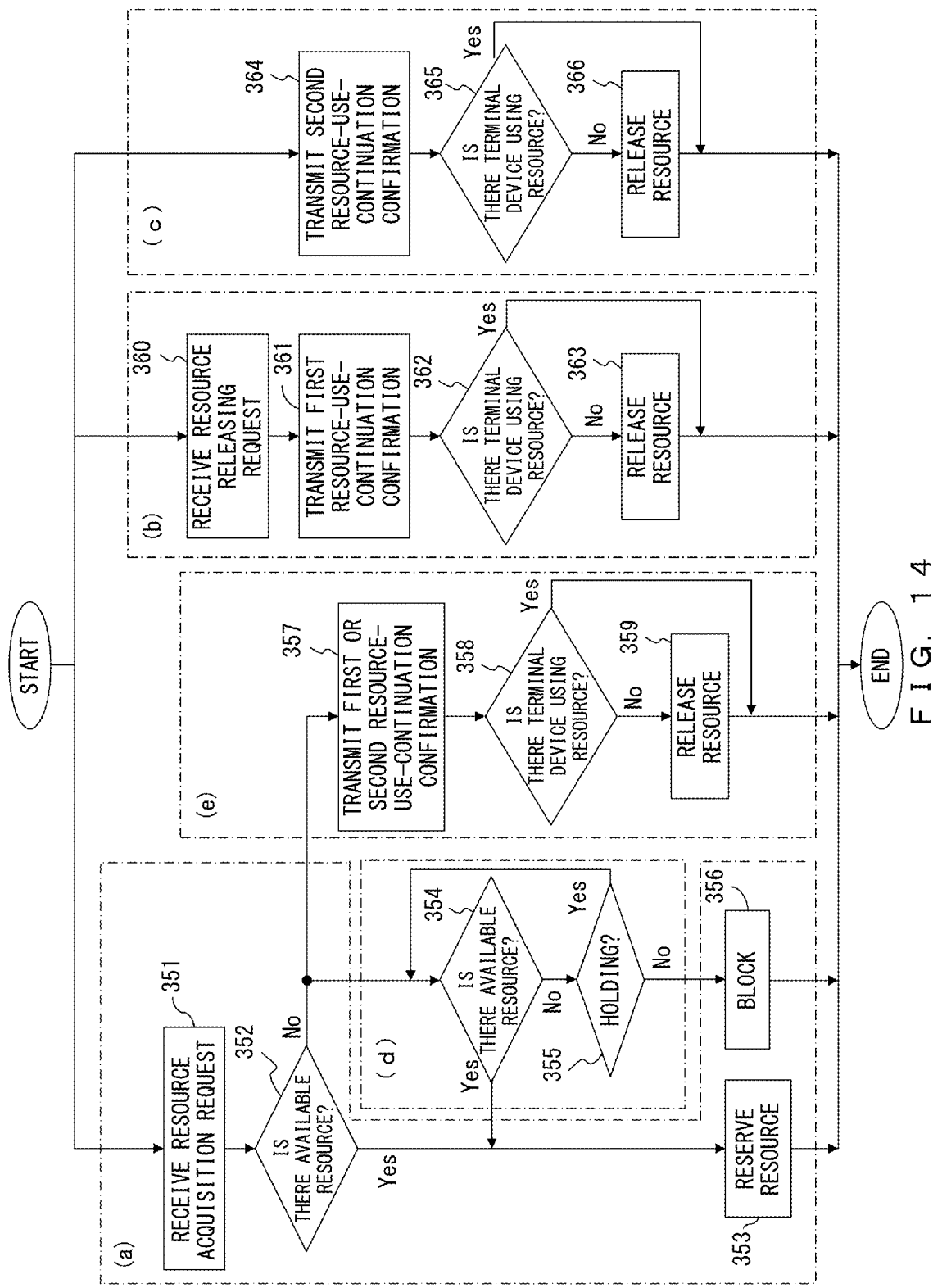
F I G. 14

| FREQUENCY | MULTICAST GROUP ADDRESS |
|---|---|
| F1 | 239.0.0.1 |
| F2 | 239.0.0.2 |
| ⋮ | ⋮ |
| Fm | 239.0.0.m |
| Fn | 239.0.0.n |
| ⋮ | ⋮ |
| F25 | 239.0.0.25 |

F I G. 1 6

COMMUNICATION DEVICE AND METHOD OF MANAGING COMMUNICATION RESOURCES

CROSS-REFERENCE TO RELATED APPLICATIONS

This application is a continuation application of International PCT Application No. PCT/JP2007/000620 which was filed on Jun. 12, 2007.

FIELD

The embodiments discussed herein are related to a communication device that receives broadcast signals in order to transmit them to a plurality of terminal devices, and to a method of managing communication resources used in such a communication device.

BACKGROUND

Digital terrestrial broadcasting started as a ground-based broadcasting service to be employed along with analog terrestrial broadcasting. BS (Broadcasting Satellite) digital broadcasting and CS (Communications Satellite) digital broadcasting were adopted as broadcasting services using satellites. When it is desired that both of the services be received in viewers' houses, each of the houses is required to be equipped with a television terminal that includes respective individual receivers or receiving functions for receiving these broadcasting services.

Meanwhile, broadband service, as represented by FTTH (Fiber to the Home), has also started full-fledged operation, and a method is being discussed to use FTTH to perform IP multicasts in order to perform IP redistribution of digital terrestrial broadcasting as a method to replace analog terrestrial broadcasting in areas where digital terrestrial broadcasting signals cannot be received. There has also begun to be discussion of the provision of a function of receiving IP redistribution to television terminals. Further, a service has been developed in which broadband service is used to allow users to view the latest Hollywood movies or the like in the form of VOD (Video on Demand) by using dedicated receivers.

Different delivery methods and delivery media have been adopted in services that have developed in various ways, such as digital terrestrial broadcasting, BS digital broadcasting, CS digital broadcasting, IP broadcasting (IPTV: Internet Protocol Television), VOD, and the like. This makes wiring for television terminals in viewers' houses and operations of such terminals complicated when plural services are to be used. Thus, a unified method of wiring and viewing is desired by users.

FIG. 1 illustrates a configuration of conventional IP redistribution in digital terrestrial broadcasting. An IPTV delivery station 101 includes a plurality of IP redistribution devices 111. An RF (Radio Frequency) receiver unit 113 in each of the IP redistribution devices 111 receives digital terrestrial broadcast waves input via an antenna 112, targeting IP redistribution.

As illustrated in FIG. 2, the above broadcast waves include digital information in the MPEG2-TS (Moving Picture Experts Group phase 2-Transport Stream) format. MPEG-2-TS is a format standardized by ISO (International Organization for Standardization)/IEC (International Electrotechnical Commission) 13818-1, and ITU-T (International Telecommunication Union Telecommunication Standardization Sector) standard H.222.0.

The RF receiver unit 113 outputs received MPEG2-TS-based image content portions and additional information portions to a CAS (Conditional Access System) cancellation unit 114 and an NIT (Network Information Table) conversion unit 117, respectively.

The CAS cancellation unit 114 cancels the CAS added to an image content portion so that conditional accesses are provided. A transcoding unit 115 transcodes the coding method from MPEG2 into 264/AVC (Advanced Video Coding). A CAS adding unit 116 again adds, to the image content portion, the CAS for IP redistribution. The NIT conversion unit 117 converts the NIT in the additional information portion into a table for IP redistribution. Thereby, frequency information in the NIT is converted into IP address information.

Thus, MPEG2-TS142 including a transcoded image content portion and an additional information portion is generated from received MPEG2-TS141, as illustrated in FIG. 3. An IP packetizing unit 118 packetizes the generated MPEG2-TS into an IP packet in the multicast format as illustrated in FIG. 4, and outputs the packet to an IP network 102.

In the IP network 102, multicast packets of all channels to be IP redistributed are relayed to a layer 2 switch (L2SW) 122 closest to an optical fiber 123 that accomodates a viewer.

A multicast router 121 disposed in the IP network 102 performs control in channel selection by exchanging messages M1 and M2 with an IP-redistribution-compatible terminal device 132 in a viewer's house 103. The exchange of messages is performed in accordance with IGMP (Internet Group Management Protocol), which is a multicast compatible group management protocol. Examples of the terminal device 132 include an IP-redistribution-compatible television receiver or recorder. As IGMP, IGMPv1 (RFC (Request For Comment) 1112) or IGMPv2 (RFC 2236) are used (see non-Patent Document 1 for example).

The layer 2 switch 122 monitors IGMP message M1 by using an IGMP snooping function, and outputs only packets addressed to a multicast group selected by a user to the optical fiber 123 accomodating that viewer.

In the viewer's house 103, multicast packets are transferred to the terminal device 132 from an ONU (Optical Network Unit) 131 connected to the optical fiber 123 in order to allow the viewer to view desired content through IP redistribution.

FIG. 5 illustrates the IP multicast relay system disclosed by Patent Document 1 below. A multicast server 161 in an IPTV delivery station 151 outputs multicast packets as illustrated in FIG. 6, and a center output device 162 relays a plurality of particular multicast packets. Thereby, a plurality of particular multicast packets in the format illustrated in FIG. 7 use different frequencies in order to be bypassed by CATV (Community Antenna Television) transmission lines 152.

A communication device 171 in a viewer's house 154 includes a table 176 registering the correspondence between frequencies and the addresses of multicast groups. When a user has selected a multicast group in IGMP message M3 using a multicast compatible terminal device 173, an IGMP receiver unit 178 receives that message and transfers it to a control unit 177.

The control unit 177 retrieves from the table 176 the frequency corresponding to the address of the selected multicast group, and transmits it to an RF receiver unit 174. The RF receiver unit 174 selects that frequency to receive the multicast packet, and a LAN (Local Area Network) output control unit 175 transfers a multicast packet as illustrated in FIG. 8 to the terminal device 173 via a LAN. Thereby, only packets for a particular multicast group are relayed to the terminal 173.

An NU (Network Unit) 172 in the viewer's house 154 is connected to the IPTV delivery station 151 via an IP network 153.

Next, an explanation will be given for management of communication resources (band resources) performed by an IGMP message on an IEEE (Institute of Electrical and Electronic Engineers) 1394 bus.

IGMPv2 defines four types of IGMP message, "Membership Report", "Leave Group", "General Query", and "Group-Specific Query".

Among them, "Membership Report" is a join message output from a terminal device for requesting that the terminal device be allowed to join a multicast group. "Leave Group" is a leave message output from a terminal device for requesting that the terminal device be allowed to leave a multicast group.

"Group-Specific Query" is a first query message output from a query router (querier) that has received "Leave Group" so that the query router can confirm whether or not there is another terminal device that participates in the same multicast group. "General Query" is a second query message periodically output from a query router in order to confirm whether or not there is a terminal device that participates each of all the multicast groups.

FIG. 9 illustrates a flowchart for a process performed when a terminal device joins a multicast group, disclosed by Patent Document 2. When receiving a join message for joining a multicast group transmitted from a terminal device (step 181), an IGMP router checks whether or not a service has started for the corresponding IP multicast address (step 182). When a service has not started, the IGMP router follows procedures for making the terminal device join the IP multicast address (step 183), and checks whether or not the procedures succeeded (step 184). When the procedures have failed, this fact is reported to the terminal device (step 189).

When the joining procedures succeeded, the IGMP router secures a synchronization channel number (step 185), and writes information about this IP multicast flow to the layer 3 flow register of the IGMP router itself (step 186). In writing this information, a counter value "1" is written to the connection counter in the layer 3 flow register. Thereafter, the same information is written to the layer 3 flow register in the terminal device (step 187).

When the service for the requested IP multicast address has started in step 182, the IGMP router increments the connection counter of its own layer 3 flow register (step 188).

As described above, when receiving a join message from a terminal device, a synchronization channel number is secured if the join message is requesting joining to a new multicast group, and if the join message is requesting joining to a multicast group for which a process has already started, the connection counter is incremented.

FIG. 10 illustrates a flowchart for a process performed when a terminal device leaves a multicast group, disclosed by Patent Document 2. When receiving a message for leaving an IP multicast address "IPm" from a terminal device (step 191), an IGMP router decrements the connection counter in its own layer 3 flow register (step 193).

The connection counter is also decremented (step 193) when a particular time has elapsed without receiving an IGMP message reporting that IP multicast address "IPm" is being received continuously (step 192). This corresponds to a case when there have been no responses to a second query message from any terminal devices within a particular period of time.

Next, the IGMP router checks whether or not the counter value of the connection counter has become "0" (step 194), and when the value has become "0", it performs a process of leaving the IP multicast group (step 195).

Patent Document 3 discloses a digital broadcast receiver device for receiving digital broadcast information from a network. This digital broadcast receiver device includes means for extracting, from received digital broadcast information, digital broadcast information corresponding to a reception request made by a terminal device, and means for transcoding the extracted digital broadcast information into information in a format that allows transfer to the terminal device through a network so that the transcoded digital broadcast information is transferred to the terminal device.

Patent Document 1: Japanese Laid-open Patent Publication No. 2003-204355

Patent Document 2: Japanese Laid-open Patent Publication No. H10-308759

Patent Document 3: Japanese Laid-open Patent Publication No. 2001-094519

Non-Patent Document 1: "Internet Group Management Protocol, Version 2", [online], [Searched for on Apr. 9, 2007], <URL:http://www.geocities.jp/kotekoteland/rfc/rfc2236j.txt> on the Internet

SUMMARY

According to an aspect of the embodiment, the communication device includes a plurality of communication resources, a resource releasing device, a receiving device, a resource allocation device, and an available resource waiting device. This communication device receives a broadcast signal and transmits the broadcast signal to a plurality of terminal devices.

The plurality of communication resources are used for receiving or transmitting the broadcast signal. The resource releasing device releases a communication resource that has ceased to be used, among the plurality of communication resources. The receiving device receives a resource acquisition request from one of the plurality of terminal devices. The resource allocation device checks whether or not there is an available communication resource in response to the resource acquisition request, and allocates an available communication resource to the resource acquisition request. The available resource waiting device temporarily holds the resource acquisition request and waits for release of a communication resource being used when the plurality of communication resources are being used and there is not an available communication resource.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates a configuration of a communication device;

FIG. 14 illustrates a flowchart for a first communication resource management process;

FIG. 16 illustrates a table managing the correspondence between frequencies and addresses;

DESCRIPTION OF EMBODIMENTS

As described above, viewers can view desired IP redistribution via conventional digital broadcasting. However, conventional IP redistribution methods have problems, as below.

Figure 1:
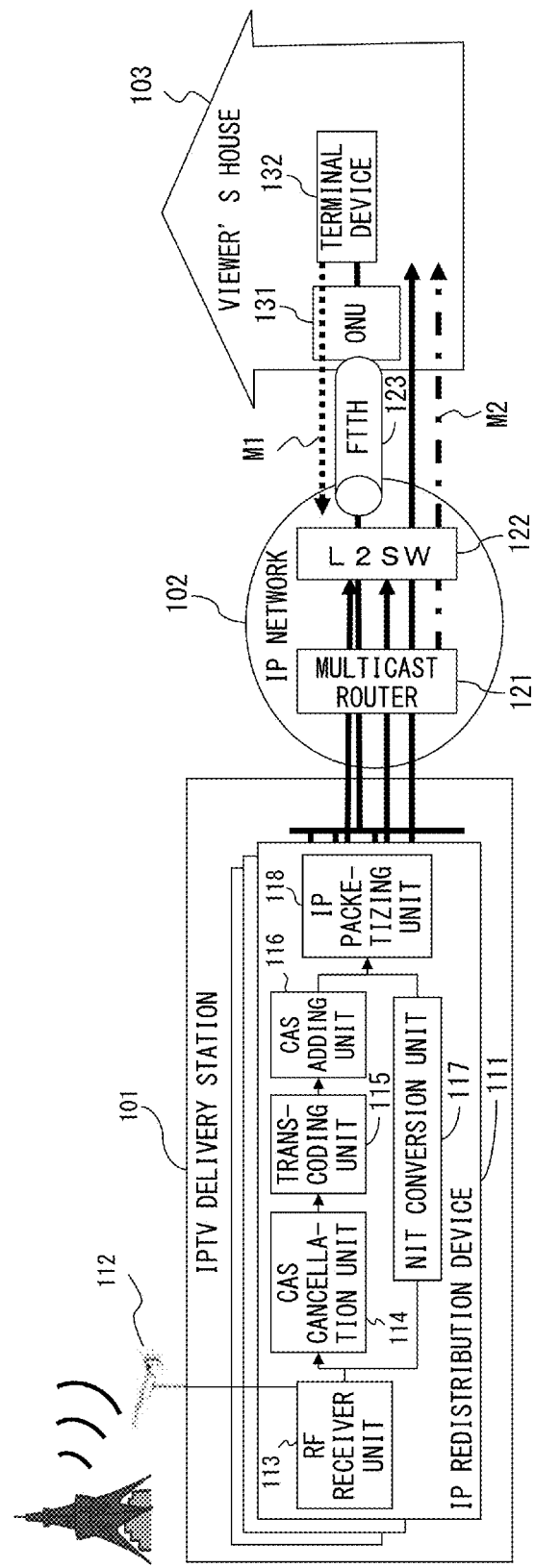
FIG. 1 illustrates a configuration of IP redistribution in digital terrestrial broadcasting.
Figure 2:
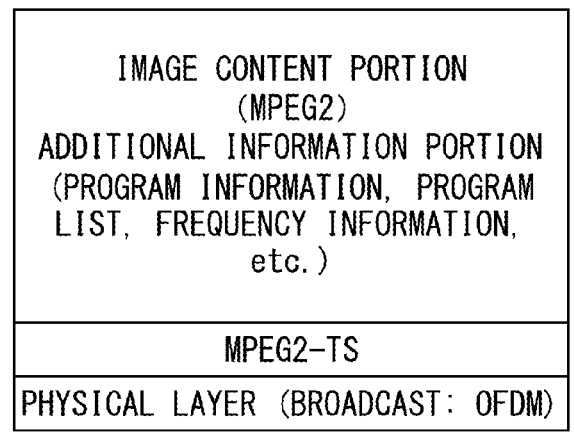
FIG. 2 illustrates MPEG2-TS.
Figure 3:
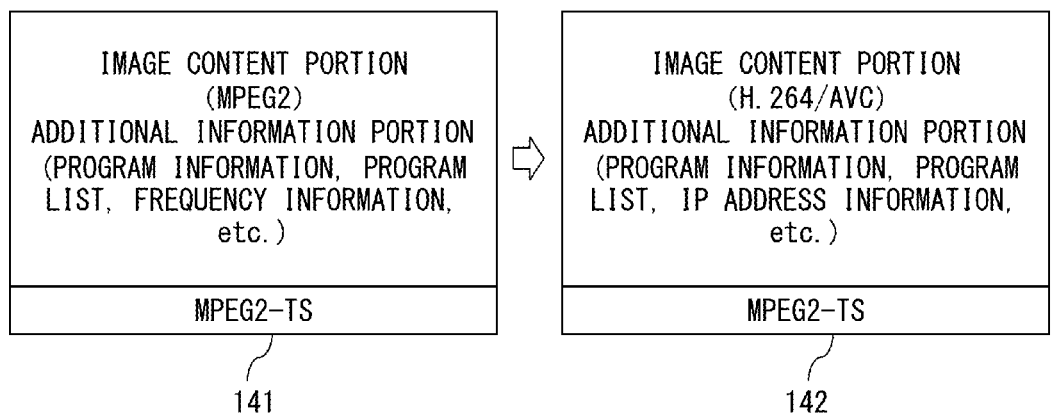
FIG. 3 illustrates conversion of MPEG2-TS.
Figure 4:
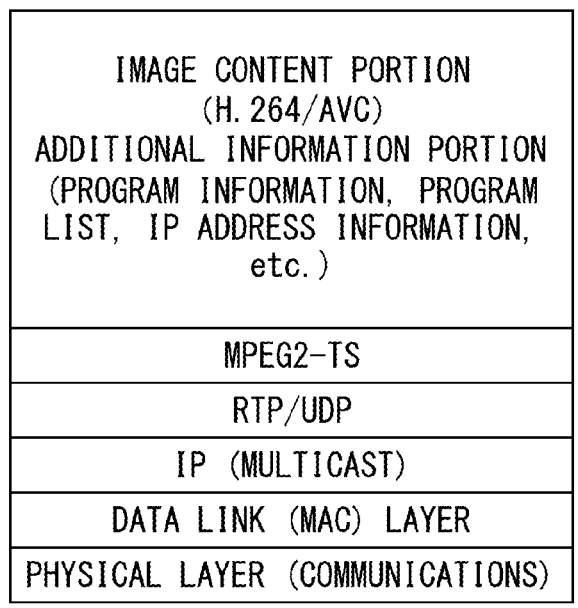
FIG. 4 illustrates a configuration of a first multicast packet.

It is conceivable to provide the IP redistribution devices 111 illustrated in FIG. 1 to the viewer's house 103 in order to provide various services to the viewer's house. However, this requires that there be as many circuits or devices as there are broadcasting channels (frequencies). In Tokyo, for example, digital terrestrial broadcasting uses 9 channels, BS digital broadcasting uses 4 channels, and 110° CS digital broadcasting uses 12 channels, resulting in the necessity for a total of 25 RF receiver units. This puts a great load particularly on detached houses in terms of area required for each unit (circuit scale) and costs.

Additionally, similar problems are thought to be caused not only in the configuration of FIG. 1 but also in other communication devices that receive broadcast signals and transmit them to plural terminal devices.

Figure 5:
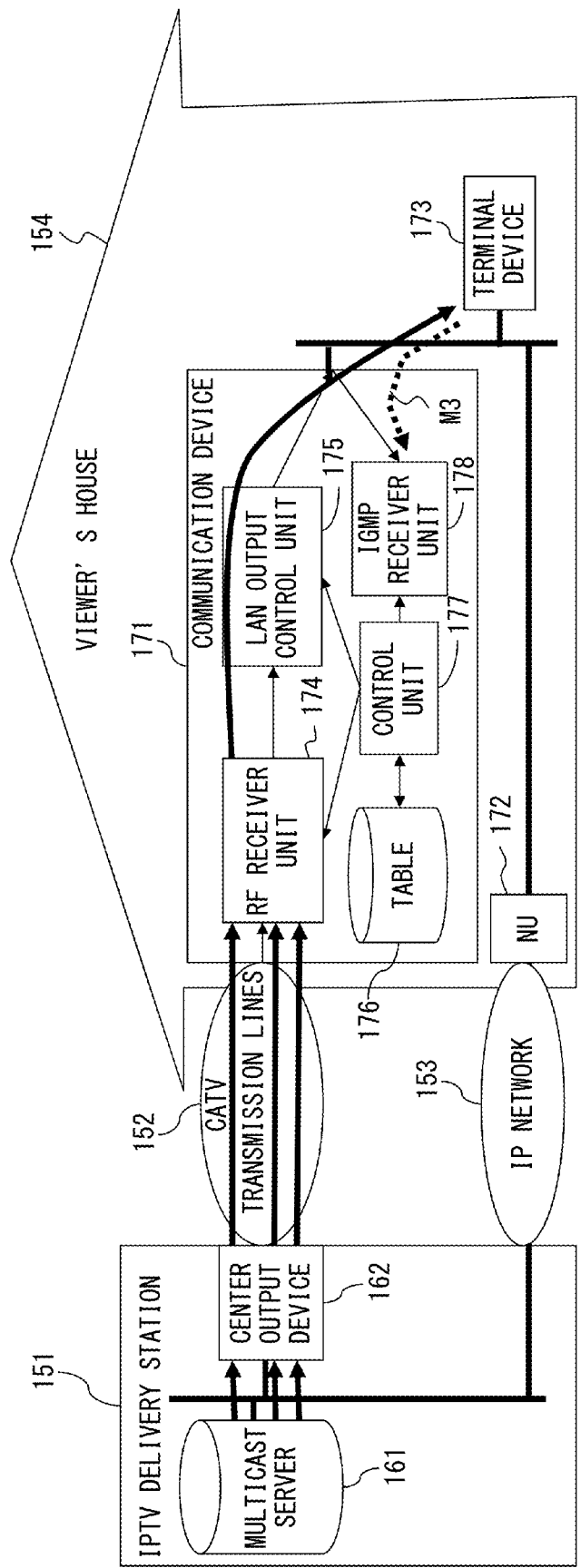
FIG. 5 illustrates an IP multicast relay system.
Figure 6:
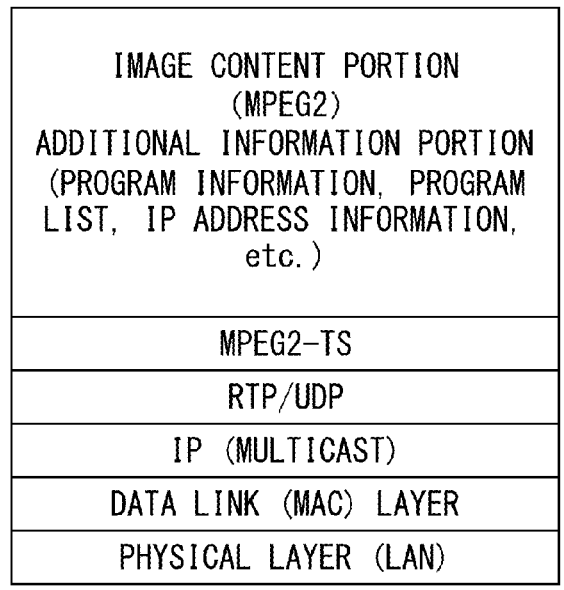
FIG. 6 illustrates a second multicast packet.
Figure 7:
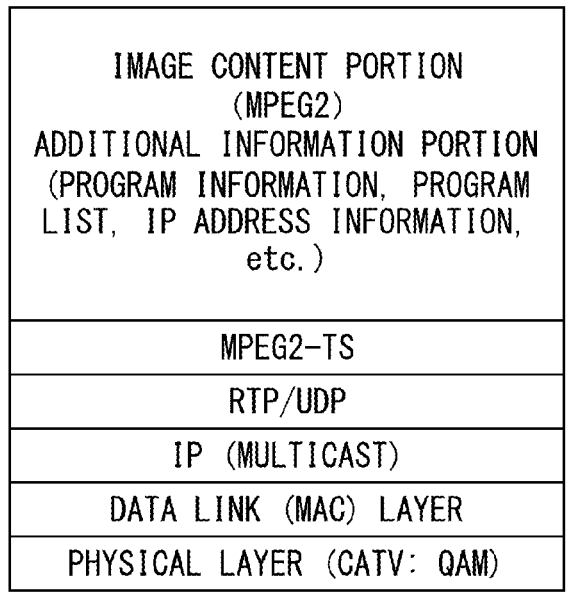
FIG. 7 illustrates a third multicast packet.
Figure 8:
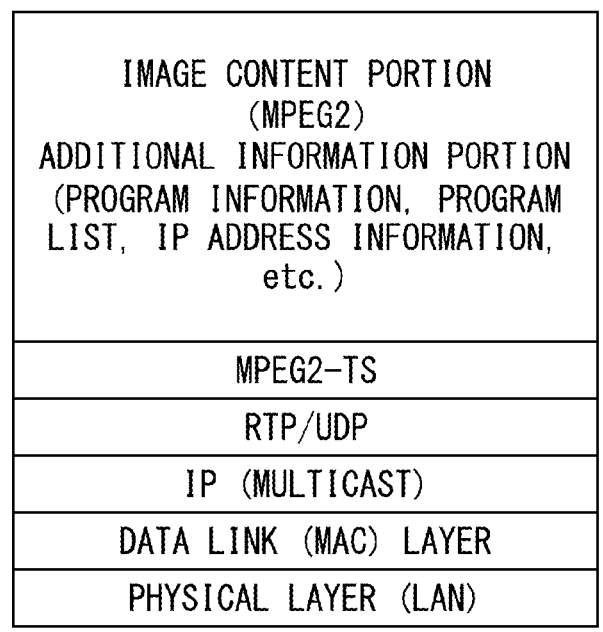
FIG. 8 illustrates a fourth multicast packet.
Figure 9:
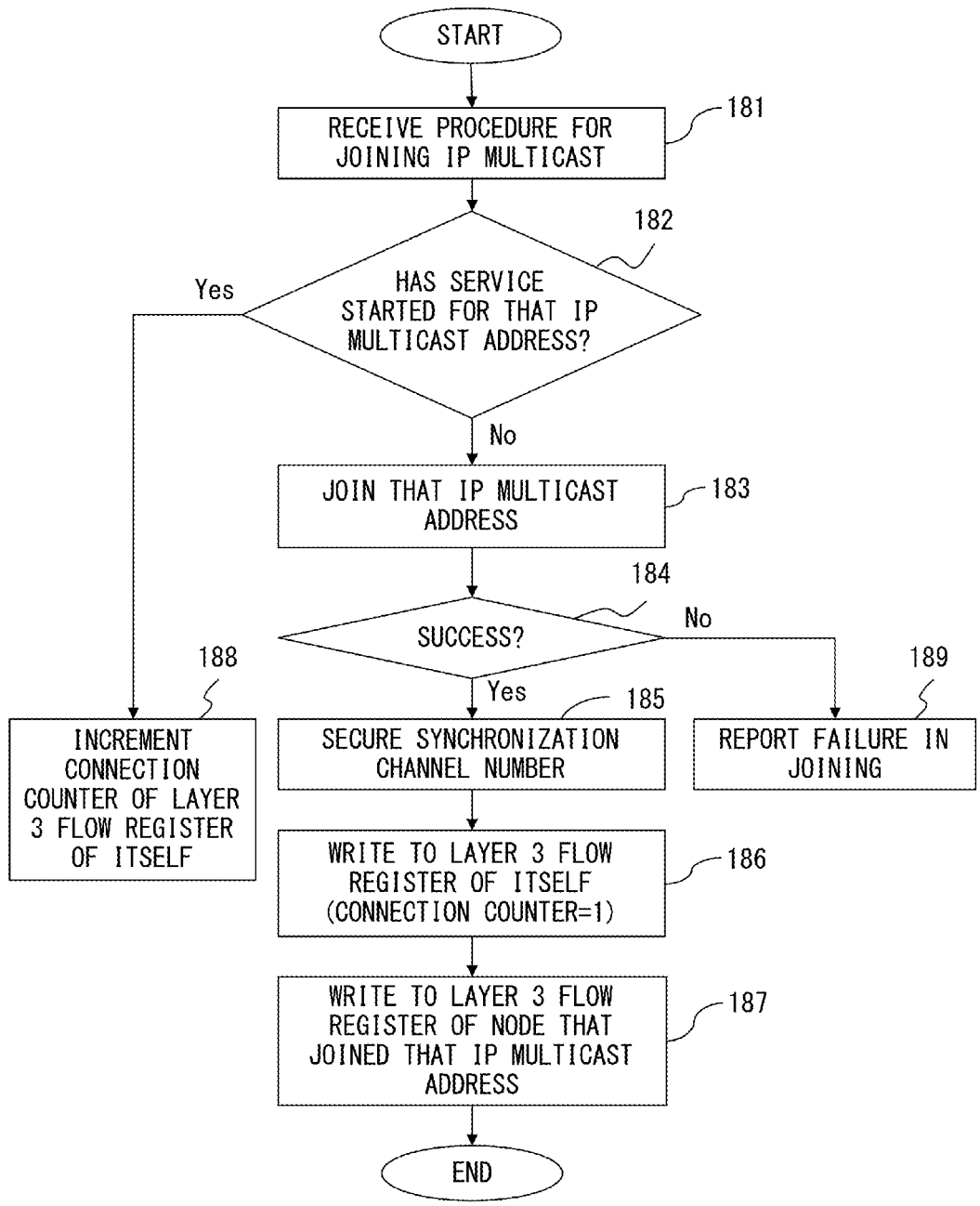
FIG. 9 illustrates a flowchart for a conventional process to be performed when a terminal device joins a multicast group.

It is also conceivable to use the configuration of the communication device 171 illustrated in FIG. 5 for the selection of channels of IP broadcasting. However, because there is only one RF receiver unit, it is impossible to simultaneously use plural different channels when it is desired to record, by using a recorder, different programs being broadcast in the same time slot, to enjoy a picture in picture (PinP) service, or to view and record programs using plural terminal devices, resulting in less convenience.

Additionally, similar problems are thought to be caused not only in the configuration of FIG. 5 but also in other communication devices that receive broadcast signals and transmit them to plural terminal devices.

Figure 10:
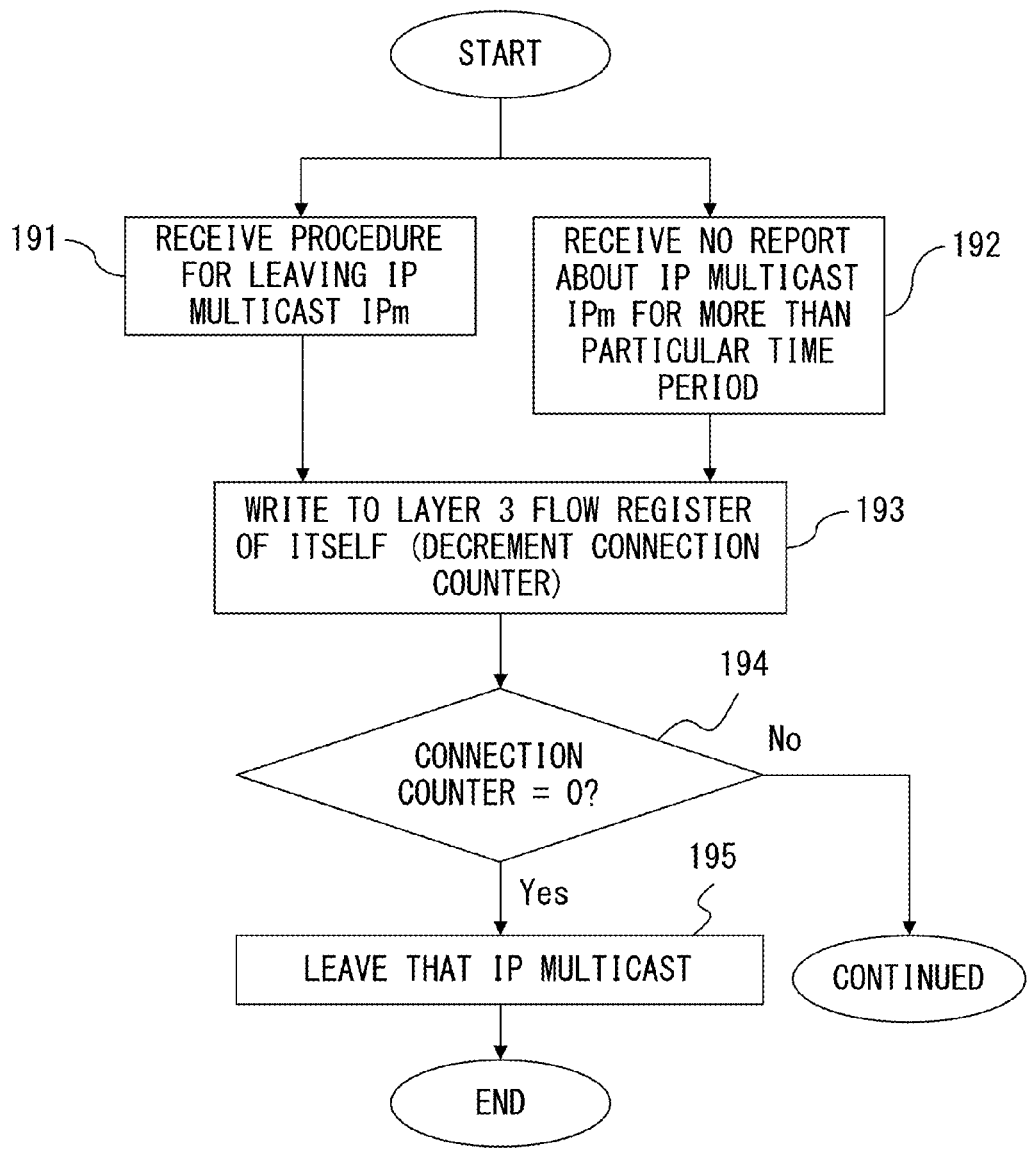
FIG. 10 illustrates a flowchart for a conventional process to be performed when a terminal device leaves a multicast group.

In the process of leaving a multicast group illustrated in FIG. 10, when a leave message is received from a terminal deice, the connection counter is decremented. However, in order to avoid message congestion, IGMPv2 does not require that all terminal devices requesting the joining should respond, by means of join messages, to first or second query messages. In other words, a terminal device can refrain from transmitting a join message when it can receive a message transmitted from a neighboring terminal device in the same multicast group.

Because of this, communication resources cannot be released immediately after the reception of a leave message. Release of communication resources is made possible only when there are no responses by means of a join message in response to a first query message.

Further, as has been explained below, the configurations in Patent Documents 2 and 3 fail to solve a problem of restriction of communication resources.

Figure 11:
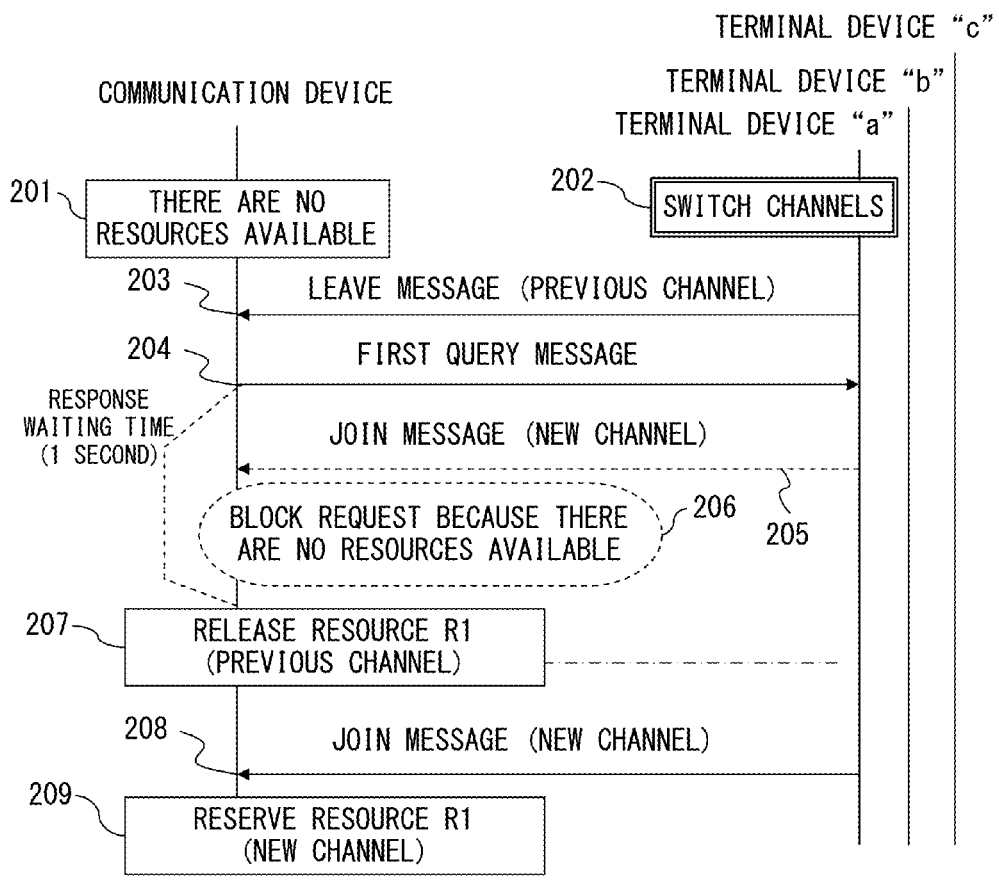
FIG. 11 illustrates a first operation sequence for switching channels.

FIG. 11 illustrates an operation sequence for switching channels in IGMPv2 when there are no resources available. When terminal device "a" using resource R1 of a communication device attempts to switch channels (procedure 202) with no resources being available in a communication device (procedure 201), the communication device cannot immediately release resource R1 that has been used for the previous channel even when it receives a leave message from terminal device "a" (procedure 203).

Thus, the communication device outputs a first query message for the multicast group corresponding to the previous channel (procedure 204), and releases resource R1 when none of the terminal devices has responded with a message for joining the multicast group within the response time (1 second) (procedure 207).

When a message for joining another multicast group (such as a new channel) is received before releasing resources (procedure 205), that request is blocked because there are no resources available (procedure 206). When a message for joining a new channel is received after releasing resources (procedure 208), the released resource R1 is allocated to the multicast group of the new channel (procedure 209).

In such a case, terminal device "a" has an interval of at least one second between outputting the message for leaving the previous channel and outputting a message for joining a new channel.

Also, IGMPv1 does not support leave messages or first query messages, and accordingly resources are released in accordance with whether or not a second query message is responded to by a join message.

Figure 12:
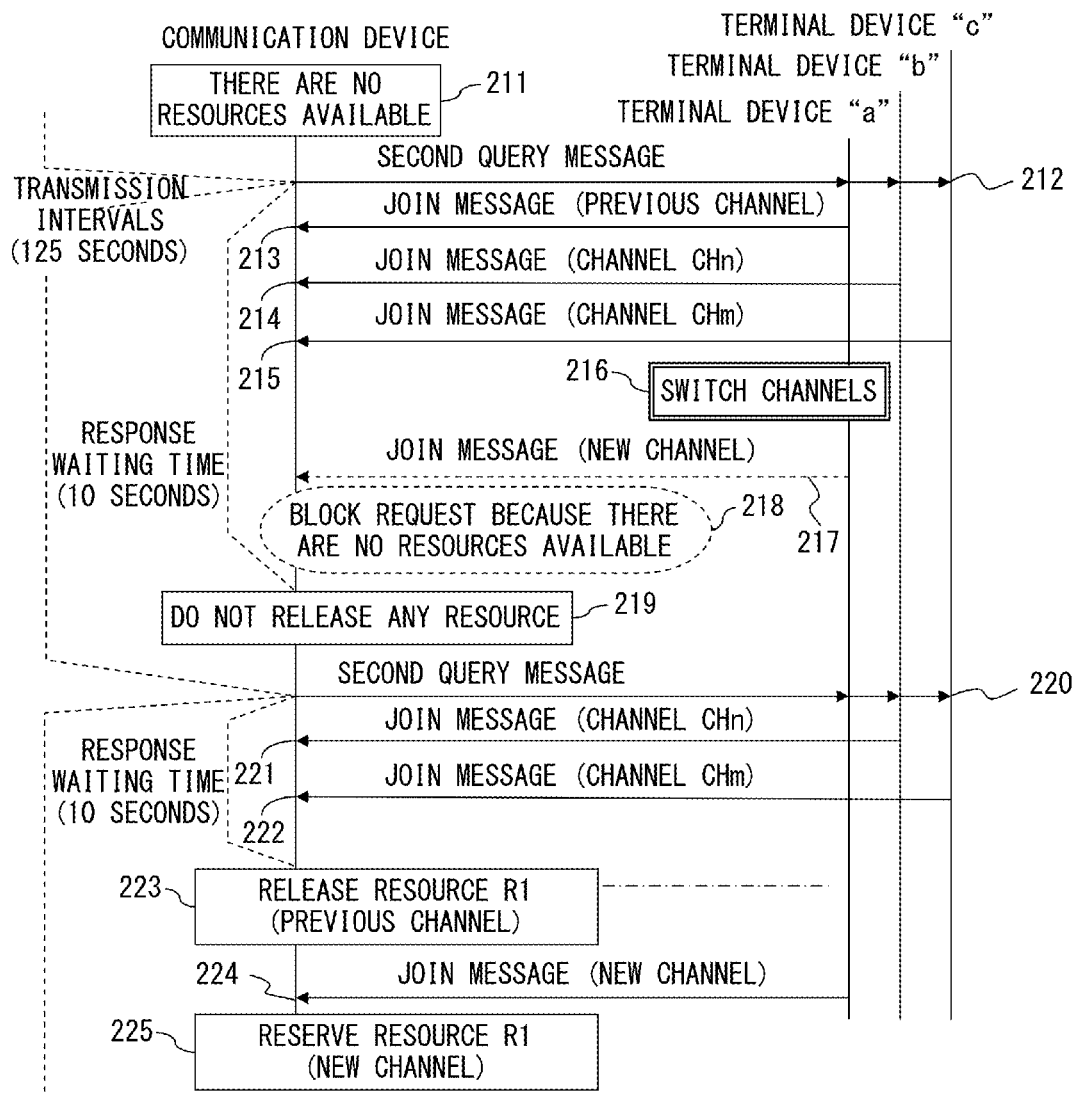
FIG. 12 illustrates a second operation sequence for switching channels.

FIG. 12 illustrates an operation sequence for switching channels when there are no resources available according to IGMPv1. When a communication device has no resources available while terminal devices "a", "b", and "c" are using resources R1, R2, and R3, respectively (procedure 211), the communication device outputs a second query message periodically at 125-second intervals for updating resources R1 through R3 (procedure 212).

In response to this, terminal devices "a" through "c" output join messages to the channels that are currently being used (the previous channel, channel CHn, and channel CHm) (procedures 213 through 215). The communication device has received join messages from all terminal devices within the response time (10 seconds) for second query messages, and thus it does not release any resources (procedure 219).

Terminal device "a" switches channels immediately after outputting the join message for the previous channel (procedure 216) in order to terminate the viewing of the previous channel. However, even when a join message for a new channel is output (procedure 217), that request is blocked (procedure 218) because there are no resources available.

The communication device outputs the second query message in the next cycle (procedure 220), and receives join messages for channels CHn and CHm from terminal devices "b" and "c" (procedures 221 and 222). However, because the communication device has not received a join message for the previous channel from terminal device "a", it releases resource R1, which was used for the previous channel (procedure 223). When a join message for a new channel is thereafter received from terminal device "a" (procedure 224), the communication device allocates the released resource R1 to the multicast group of the new channel (procedure 225).

As described above, only when none of the terminal devices has transmitted, in response to the second query message in the next cycle, messages for joining the multicast group corresponding to resource R1 can resource R1 be released. In other words, terminal device "a" has an interval of at least 135 seconds (the interval for transmitting the second query message (125 seconds)+response time (10 seconds)) between outputting the message for joining the previous channel and outputting a message for joining a new channel.

As described above, timings for outputting messages are greatly restricted in reacquisitions of limited resources such as in cases of switching channels.

Additionally, similar problems are thought to be caused not only in devices adopting IGMPv1 or IGMPv2, but also in devices adopting other protocols.

Preferred embodiments of the present invention will be explained with reference to accompanying drawings.

FIG. 13 illustrates a configuration of a communication device according to an embodiment. The communication device illustrated in FIG. 13 includes k communication resources 301-1 through 301-k, a resource releasing device 302, a receiving device 303, a resource allocation device 304, and an available resource waiting device 305. This communication device receives broadcast signals in order to transmit them to plural terminal devices.

The communication resources 301-1 through 301-k are used for receiving or transmitting broadcast signals. The resource releasing device 302 releases communication resources that have ceased to be used among the communication resources 301-1 through 301-k. The receiving device 303 receives a resource acquisition request from one of plural terminal devices. The resource allocation device 304 checks, in response to a resource acquisition request, whether or not there are available communication resources, and allocates available resources to that resource acquisition request. The available resource waiting device 305 temporarily holds a resource acquisition request in order to wait for communication resources to be released when there are no communication resources available, with the communication resources 301-1 through 301-k all being used.

According to this communication device, when one communication resource is released by the resource releasing device 302, the resource allocation device 304 can allocate the released communication resource to a resource acquisition request that has been held.

It is also possible to employ a configuration in which, when there are no communication resources available, a resource-use-continuation confirmation message is transmitted to a terminal device using a communication resource in order to confirm whether the terminal device will continue to use the communication resource, and when there is no response to that confirmation message, the communication resource being used are released.

The communication resources 301-1 through 301-k correspond to, for example, an RF receiver unit 384 or a conversion unit 385 that will be described later in FIG. 15, and the resource releasing device 302, the resource allocation device 304, and the available resource waiting device 305 correspond to, for example, a control unit 389. The receiving device 303 corresponds to, for example, an IGMP transmission/reception unit 390.

According to a communication device according to an embodiment, the likelihood of resource acquisition requests being blocked is reduced when there are no communication resources available, and thereby the convenience and the use efficiency of resources are improved.

Specifically, restrictions in the timings for transmitting messages for releasing resources for previous channels and messages for reserving resources for new channels are eliminated in a protocol by which terminal devices for receiving IP broadcast signals using multicast performs switching of channels, and thereby such messages can be output successively. This reduces the time needed to switch resources.

Also, by making it possible to output resource-use-continuation confirmation messages when there are no resources available, communication resources that have ceased to be used can be released promptly. This reduces the time period for waiting for switching channels from approximately 135 seconds to approximately 1 second, which is a time period that can be tolerated by a human during operation, and thereby the convenience is improved greatly.

Further, it is also possible to greatly reduce the number of RF receiver units; previously there were required to be as many RF receiver units as there were broadcasting channels in a communication device that can simultaneously receive a plurality of different channels. For example, when 3 channels are to be received simultaneously in Tokyo, 6 RF receiver units in total are sufficient, as digital terrestrial broadcasting, BS digital broadcasting, and CS digital broadcasting each uses two RF receiver units, leading to a great reduction in cost.

FIG. 14 illustrates a flowchart of a communication resource management process performed by a communication device. This communication resource management process includes the following five processes.

(a) Resource reservation process (steps 351 through 353 and 356)

(b) First resource releasing process (steps 360 through 363)

(c) Second resource releasing process (steps 364 through 366)

(d) available resource waiting process (steps 354 through 355)

(e) Third resource releasing process (steps 357 through 359)

In (a) the resource reservation process, when receiving a resource acquisition request from a terminal device (step 351), the communication device checks whether or not there is an available resource (step 352). When there is an available resource, the communication device allocates that resource to the terminal device (step 353). A resource acquisition request corresponds to, for example, a join message for securing a new resource.

When there are no available resources, (d) available resource waiting process is executed in which the communication device waits for a resource to become available while holding the corresponding resource acquisition request temporarily. In this available resource waiting process, whether or not there is an available resource is checked periodically (step 354), and when there is an available resource, the process in step 353 is executed. When there are no available resources, whether or not a holding period has elapsed is checked (step 355). When the holding period has not elapsed, the processes in and after step 354 are repeated. When the holding period has elapsed, the resource acquisition request is blocked (step 356).

The communication device executes either the first, the second, or the third resource releasing process in order to release a resource.

In (b) first resource releasing process, when the communication device receives from a terminal device a request to release a resource (step 360), the communication device transmits a first resource-use-continuation confirmation to the terminal device that is using the corresponding resource (step 361), and checks whether or not there is a terminal device that is using the corresponding resource (step 362). When there is not such a terminal device, the communication device releases that resource (step 363), and when there is a terminal device that is using that resource, the communication device does not release it. A resource releasing request corresponds to, for example, a leave message for releasing a previous resource, and a first resource-use-continuation confirmation corresponds to, for example, a first query message transmitted when a leave message has been received.

A combination of processes (a), (d), and (b) makes it possible to transmit leave messages and join messages continuously in the switching of resources performed by terminal devices and in the reacquisition of resources. Thereby, the convenience and the use efficiency of resources are improved.

In (c) second resource releasing process, the communication device periodically transmits a second resource-use-continuation confirmation (step 364), and checks whether there is a terminal device that is using respective resources (step 365). When there are no terminal devices that are using a particular resource, the communication device releases that resource (step 366), and when there are no resources that are not being used by any terminal devices, the communication device does not release any resources. A second resource-use-continuation confirmation corresponds to, for example, a second query message that is transmitted periodically.

(e) Third resource releasing process is executed when there are no available resources in step 352. In such a case, the communication device transmits first or second resource-use-continuation confirmation (step 357), and checks whether or not there is a terminal device that is using a resource (step 358). When there are no terminal devices that are using a resource, the communication device releases that resource (step 359), and when there is a terminal device that is using the resource, the communication device does not release it.

A combination of processes of (a), (d), (c), and (e) makes it possible to output join messages at an arbitrary timing in the switching of resources performed by terminal devices and in the reacquisition of resources. Thereby, the convenience and the use efficiency of resources are improved.

Also, a combination of the processes in (a), (d), (b), and (e) makes it possible to allocate, to a new resource acquisition request, resources that have been left in a reserved state when power discontinuity or the like has prevented a leave message from being transmitted that will release them. Thereby, the convenience and the use efficiency of resources are improved.

Figure 15:
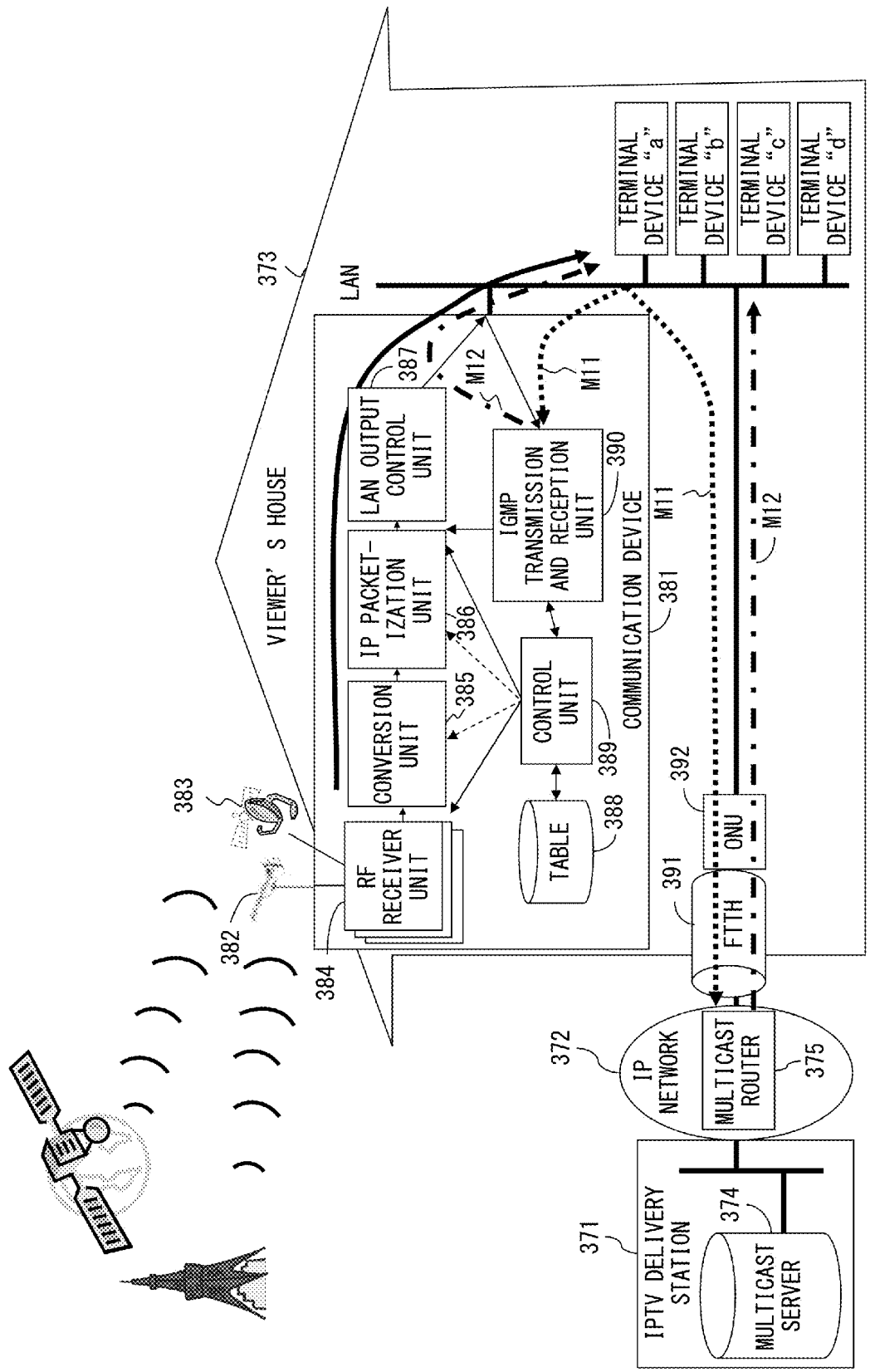
FIG. 15 illustrates a configuration of a communication system.

FIG. 15 illustrates an exemplary configuration in which the above communication resource management process is implemented so that it can receive various services including digital terrestrial broadcasting, BS digital broadcasting, CS digital broadcasting, IP broadcasting, and the like.

In this communications system, a communication device 381 provided in a viewer's house 373 operates as a multicast router in IGMP, and is connected, via a multicast compatible LAN, to terminal devices "a" through "d" that can receive IP broadcasts.

An ONU 392 connected to a LAN is connected to a multicast server 374 in an IPTV delivery station 371 via an optical fiber 391 and an IP network 372. The multicast server 374 stores content to be IP broadcast in order to output it to the IP network 372. The multicast router 375 in the IP network 372 relays the content to the viewer's house 373 via the optical fiber 391.

The communication device 381 includes an antenna 382 for digital terrestrial broadcasting, an antenna 383 for BS/CS digital broadcasting, a plurality of RF receiver units 384, a conversion unit 385, an IP packetization unit 386, a LAN output control unit 387, a table 388, a control unit 389, and an IGMP transmission/reception unit 390.

The RF receiver units 384 correspond to communication resources to be managed, and receive broadcast waves, as transmitted through digital terrestrial broadcasting or BS/CS digital broadcasting, that are input from the antenna 382 or the antenna 383. The conversion unit 385 corresponds to the CAS cancellation unit 114, the transcoding unit 115, the CAS adding unit 116, and the NIT conversion unit 117 illustrated in FIG. 1, and converts a method of coding the image content portions included in the received broadcast waves, the frequency information in the additional information portion, and the like into a method and information that are appropriate for IP redistribution.

The IP packetization unit 386 converts, into IP packets in a multicast format, MPEG2-TS including the converted image content portion and additional information portion, and the LAN output control unit 387 outputs to a LAN only IP packets specified by the control unit 389.

As illustrated in FIG. 16, the table 388 holds the correspondence relationship between reception frequencies and addresses of the multicast groups. The IGMP transmission/reception unit 390 transmits and receives, to and from the LAN, IGMP messages used by the control unit 389 and terminal devices "a" through "d" for controlling the selection of receiving channels.

The control unit 389 entirely controls the reception and IP redistribution of broadcast waves, and performs a communication resource management process as illustrated in FIG. 14.

As described above, as the IGMP messages, IGMP messages according to IGMPv1 or IGMPV2 are used.

IGMPv2 defines join message (Membership Report), leave message (Leave Group), first query message (Group-Specific Query), and second query message (General Query). Among them, join messages and leave messages are transmitted as IGMP message M11 from terminal devices "a" through "d" to the control unit 389. First and second query messages are transmitted as IGMP message M12 from the control unit 389 to terminal devices "a" through "d".

IGMP message M11 is also transmitted to the multicast router 375 from terminal devices "a" through "d", and IGMP message M12 is also transmitted to terminal devices "a" through "d" from the multicast router 375.

IGMPv1 does not support leave messages or first query messages from the four types of messages above.

According to IGMP, a physical network has only one query router, which issues queries. Candidates for the query router in the communications system illustrated in FIG. 15 are the multicast router 375 and the communication device 381, and selection of a query router is made using a known technique.

Next, by referring to FIGS. 17 through 20, explanations will be given for a communication resource management process based on the combination of (a), (d), and (b) illustrated in FIG. 14.

Figure 17:
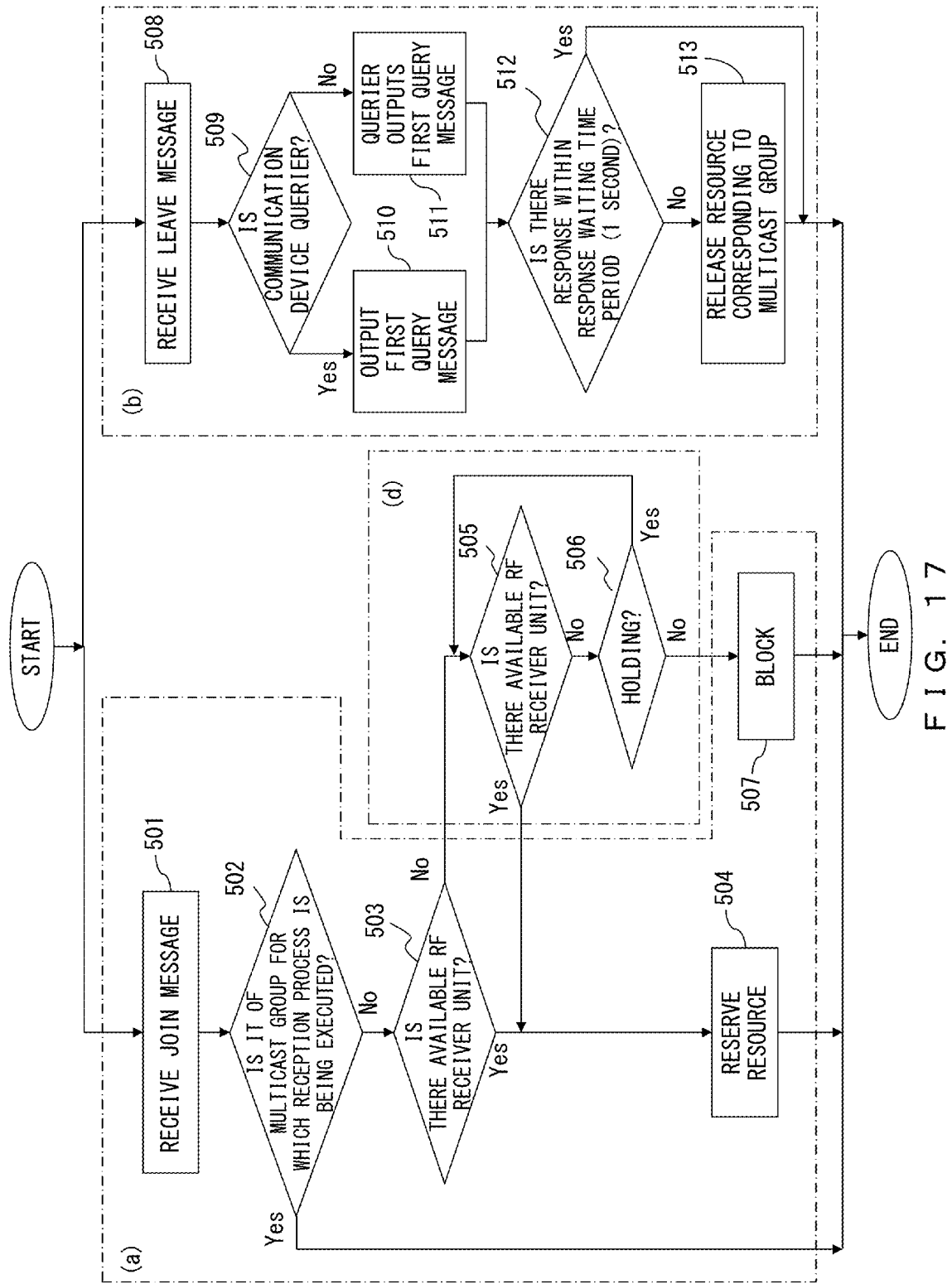
FIG. 17 illustrates a flowchart for a second communication resource management process.

FIG. 17 is a flowchart for this communication resource management process. When receiving a join message from a terminal device (step 501), the control unit 389 analyzes the address of the multicast group in the join message in order to check whether or not the address is of the multicast group for which a receiving process is being executed (step 502). When the checked address is of the multicast group for which a receiving process is being executed, this means the same channel as that of another terminal device that has already been receiving broadcast is received. Thus, the process for that join message is terminated.

When the address of the multicast group in the join message is not of the multicast group for which a receiving process is being executed, it is checked whether or not there is available RF receiver unit 384 (an available resource) (step 503), and when there is an available resource, that resource is reserved (step 504).

In reserving the resource, the available RF receiver unit 384 is allocated to the corresponding multicast group, and the table 388 is searched for the reception frequency corresponding to the address of the multicast group. Thereafter, the reception frequency is set in the RF receiver unit 384, and the LAN output control unit 387 is permitted to output packets addressed to that multicast group.

When there are no available resources in step 503, the control unit 389 waits for an RF receiver unit 384 to become available for a specified waiting time period (holding period). In this available resource waiting process, the control unit 389 periodically checks whether or not there is an available resource (step 505), and when there is an available resource, the process in step 504 is performed. When there are no resources available, the control unit 389 checks whether the waiting time period has elapsed (step 506). When the waiting time period has not elapsed, the control unit 389 repeats the processes in and after step 505. When the waiting time period has elapsed, the control unit 389 blocks the corresponding join message (step 507).

Accordingly, if a resource has been released to become available within the waiting time period or at the time the waiting time period has elapsed, that resource is reserved. Also, a blocking process is performed against the corresponding join message only when no resources have been made to be available even after the waiting time period has elapsed. An example of this waiting time period is a particular time period (1 second+α) that can be obtained by adding a margin to the time period for waiting for a response to a first query message, which is 1 second. It is also possible to set the number of times of confirming resource availability instead of setting a waiting time period so that the process in step 505 is performed that number of times.

When receiving a leave message from a terminal device (step 508), the control unit 389 checks whether or not the communication device 381 serves as a query router (step 509) in parallel to the processes in steps 501 through 507. When the communication device 381 serves as a query router, the control unit 389 outputs, to the LAN via the LAN output control unit 387, a first query message in which a response waiting time period is set (step 510). This first query message is addressed to the multicast group specified by the leave message. Generally, 1 second is set as the above response waiting time period.

When the communication device 381 is not serving as a query router, a different device that serves as a query router (such as the multicast router 375) outputs a first query message (step 511).

Next, the control unit 389 monitors responses from terminal devices (step 512) regardless of whether or not the communication device 381 serves as a query router, and releases the resource that was allocated to the corresponding multicast group when there are no responses within the response waiting time period (step 513).

In releasing the resource, the control unit 389 makes the LAN output control unit 387 stop outputting packets addressed to the corresponding multicast group, and releases the RF receiver unit 384 that has been allocated to that multicast group.

Where there is a response within the response waiting time period, the processes for the corresponding multicast group are terminated. Accordingly, outputting of packets addressed to that multicast group is continued, and the resource is not released.

Figure 18:
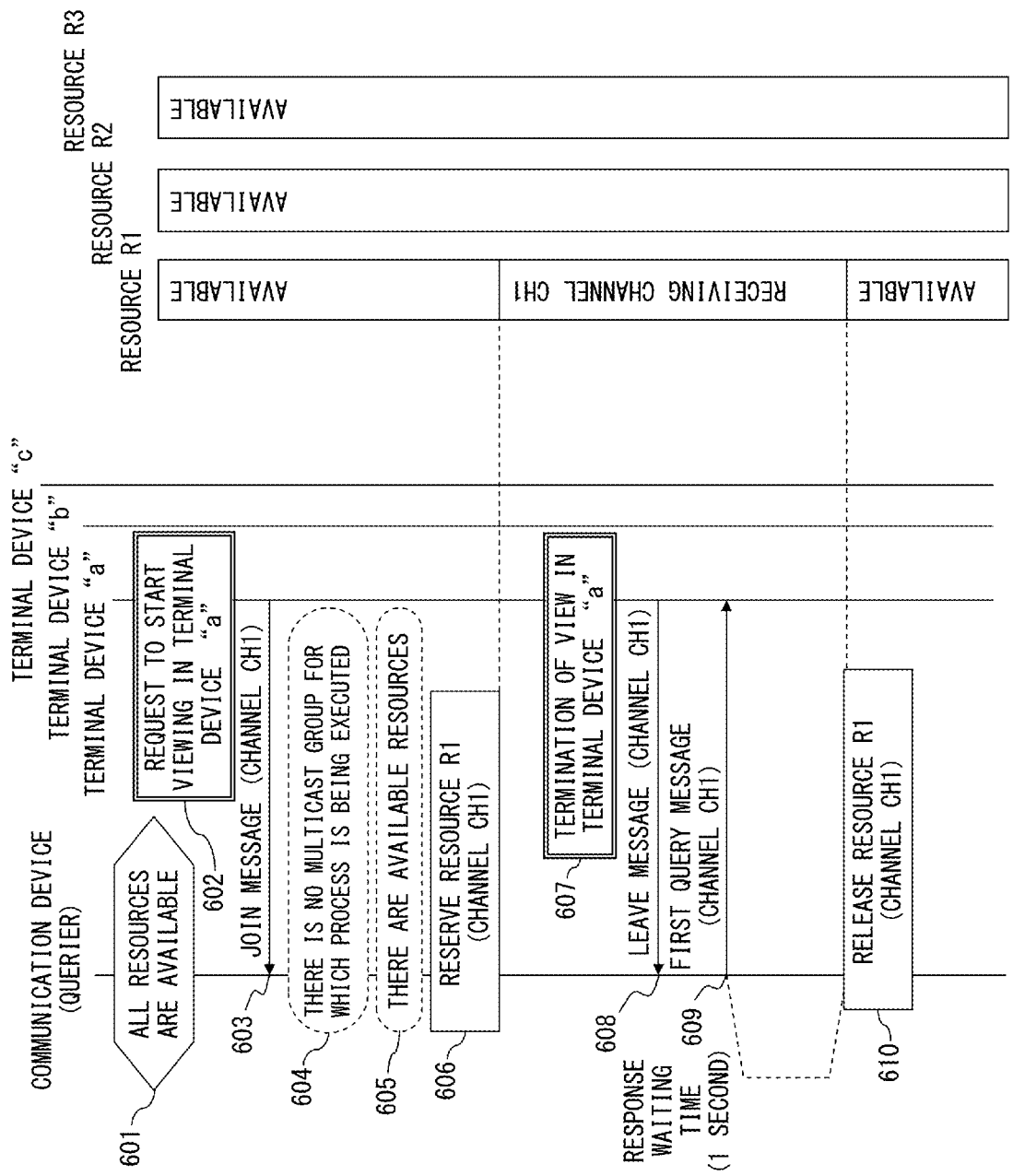
FIG. 18 illustrates a first operation sequence for the communication system.

FIG. 18 illustrates an operation sequence of the most basic operation, i.e., an operation for a terminal device to start and terminate a view. In this example, the communication device 381 is provided with three RF receiver units 384 (resources R1 through R3), and the communication device 381 serves as a query router.

First, when all resources are available (procedure 601), a request to start viewing channel CH1 is issued in terminal device "a" (procedure 602), and then terminal device "a" outputs a join message in which the address of the multicast group corresponding to channel CH1 is set (procedure 603).

Receiving that join message, the communication device 381 reserves resource R1 for the corresponding multicast group (procedure 606) because there is no multicast groups for which a process is being executed (procedure 604) and also there are available resources (procedure 605).

Thereby, the RF receiver unit 384 serving as resource R1 starts receiving channel CH1, and outputs, to the LAN, packets addressed to the multicast group corresponding to the channel CH1. Terminal device "a" starts viewing channel CH1.

When viewing of channel CH1 is terminated in terminal device "a" (procedure 607), terminal device "a" outputs, to all multicast routers (address: 224.0.0.2), a leave message in which the address of the multicast group corresponding to channel CH is set (procedure 608).

The communication device 381 that has received that leave message, as the communication device 381 itself serving as a query router, outputs, to the corresponding multicast group, a first query message in which the address of the multicast group specified by the leave message and the response waiting time period (1 second) are set (procedure 609). Then, the communication device 381 monitors responses from terminal devices for the set response waiting time period.

Because there are no responses from terminal devices in the multicast group within the response waiting time period, the communication device 381 releases resource R1, which corresponds to that multicast group (procedure 610).

Thereby, packets addressed to the multicast group corresponding to channel CH1 are prevented from being output to a LAN, so that resource R1 becomes available.

Figure 19:
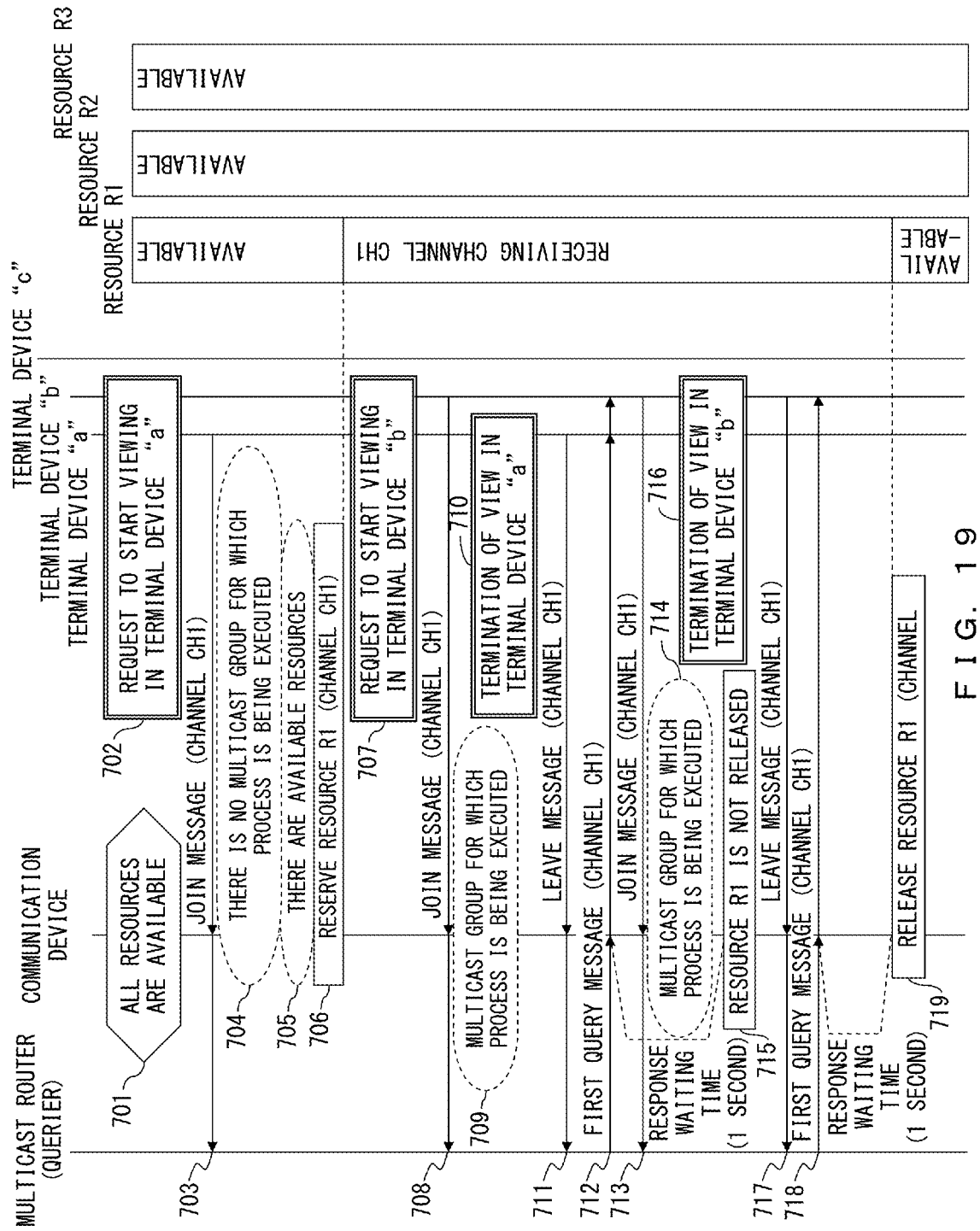
FIG. 19 illustrates a second operation sequence for the communication system.

FIG. 19 illustrates an operation sequence in which two terminal devices view the same channel. In this example, in contrast to the example illustrated in FIG. 18, the multicast router 375 serves as a query router.

The sequence between procedures 701 and 706, which is for terminal device "a" to start the viewing of channel CH1, is the same as the sequence between procedures 601 and 606. However, messages output from terminal device "a" are received by both the multicast router 375 and the communication device 381.

Additionally, the multicast router 375, which serves as a query router that has received a join message, cannot obtain packets to transfer even when it has started a process of transferring packets to the multicast group because there are no multicast servers that transmit packets addressed to that multicast group. Or the multicast router 375 does not perform a process of transferring packets to that multicast group because of the setting of an IP filter or the like. Accordingly, packets are not output from the multicast router 375 to that multicast group.

Next, terminal device "b" outputs a join message in which the address of the multicast group corresponding to channel CH1 is set (procedure 708) when a request to start viewing channel CH1 is issued in terminal device "b" (procedure 707).

The communication device 381 that has received the above join message is executing the process for the corresponding multicast group (procedure 709), and terminates the process for the join message. However, packets for the multicast group corresponding to channel CH1 have already been output to the LAN, which allows terminal device "b" to start viewing channel CH1.

Next, when terminal device "a" terminates the viewing of channel CH1 (procedure 710), terminal device "a" outputs a message to leave channel CH1 to all multicast routers (procedure 711).

The multicast router 375 that has received that leave message, as the multicast router 375 itself serving as a query router, outputs a first query message to the corresponding multicast group (procedure 712).

The communication device 381 that has received that leave message, as the communication device 381 itself does not serve as a query router, terminates the process for the leave message. Also, the communication device 381 that has received a first query message monitors responses from terminal devices for the response waiting time period (1 second) set in that first query message.

Terminal device "b" that has received a first query message outputs a join message in which the address of the multicast group corresponding to channel CH1 is set, so that terminal device "b" can continue to view channel CH1 (procedure 713).

The communication device 381 that has received the join message terminates the process for the join message because a process is being executed for the corresponding multicast group (procedure 714).

When the response waiting time period has elapsed, the communication device 381 does not release resource R1 because it has received a response from terminal device "b" in the multicast group corresponding to channel CH1 within this time period (procedure 715). Accordingly, output of packets addressed to that multicast group is continued, and resource R1 reserved for that multicast group is not released.

Next, when terminal device "b" terminates viewing of channel CH1 (procedure 716), terminal device "b" outputs a message to leave channel CH1 to all multicast routers (procedure 717).

The multicast router 375 that has received that leave message, as the multicast router 375 itself serves as a query router, outputs a first query message to that multicast group again (procedure 718).

The communication device 381 that has received the leave message, as the communication device 381 itself does not serve as a query router, terminates the process for the leave message. Also, the communication device 381 that has received a first query message monitors responses from terminal devices for a response waiting time period (1 second) set in that first query message.

When the response waiting time period has elapsed, the communication device 381 releases resource R1 because it has not received a response from any terminal devices in the multicast group corresponding to channel CH1 within this time period (procedure 719).

Thereby, packets addressed to the multicast group corresponding to channel CH1 are stopped from being output to the LAN, and resource R1 becomes available.

Figure 20:
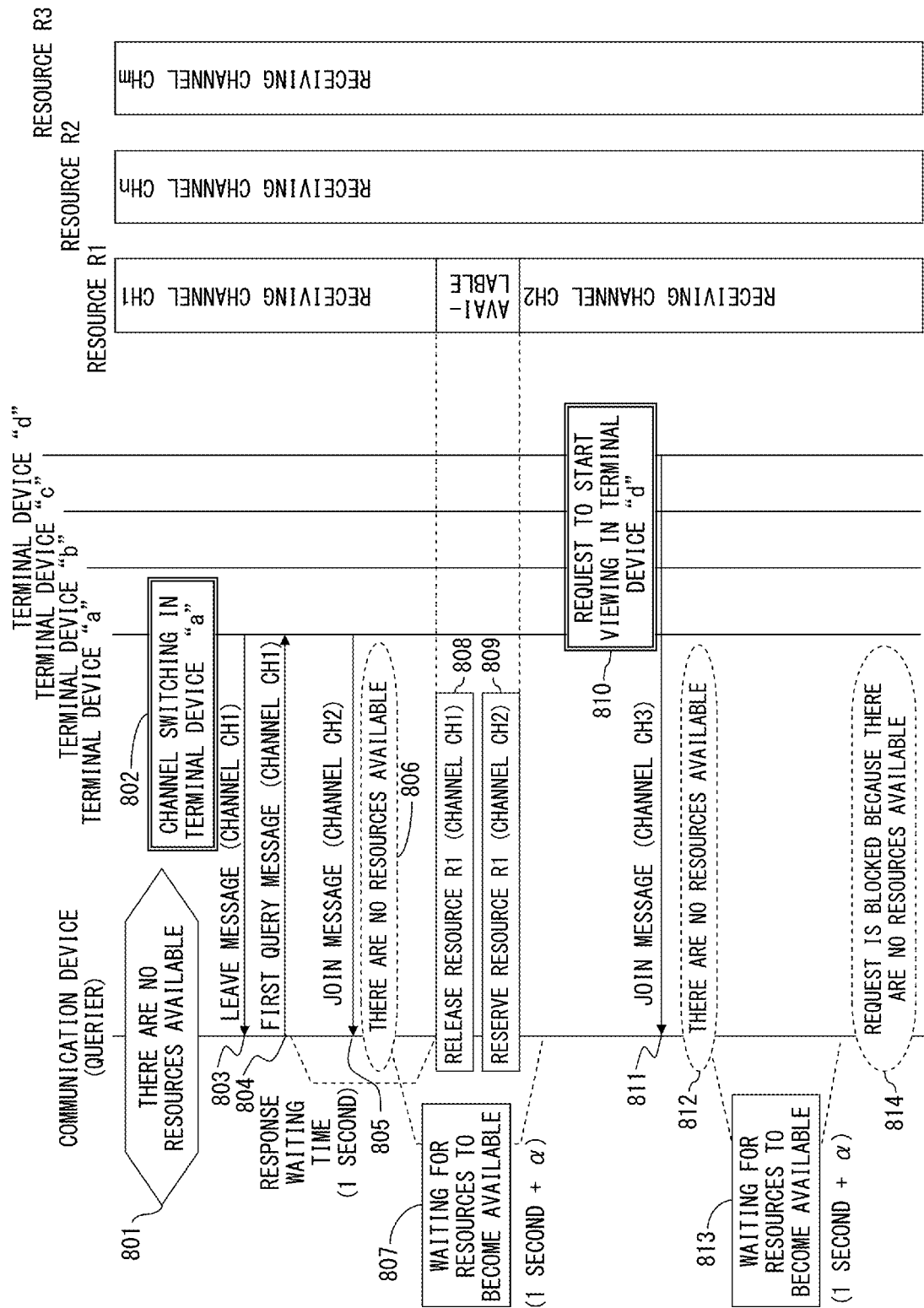
FIG. 20 illustrates a third operation sequence for the communication system.

FIG. 20 illustrates an operation sequence in the block for switching channels and making a request to start viewing a new channel when there are no resources available. In this example, the communication device 381 serves as a query router, terminal device "a" uses resource R1 for viewing channel CH1, terminal device "b" uses resource R2 for viewing channel CHn, and terminal device "c" uses resource R3 for viewing channel CHm.

First, when a request to switch from channel CH1 to channel CH2 is made in terminal device "a" (procedure 802) when there are no resources available (procedure 801), terminal device "a" outputs, to all multicast routers, a leave message in which the address is set for the multicast group corresponding to channel CH1, the viewing of which is to be terminated (procedure 803).

The communication device 381 that has received the leave message, as the communication device 381 itself serving as a query router, outputs a first query message to that multicast group (procedure 804), and monitors responses from terminal devices for the response waiting time period (1 second) set in the first query message.

Next, terminal device "a" outputs a join message in which the address is set for the multicast group corresponding to channel CH2, the viewing of which is to be started (procedure 805).

The communication device 381 that has received the join message waits, for a specified time period (1 second+α), for resources to become available (procedure 807) because no process is being executed for that multicast group and there are no resources available (procedure 806).

Because there are no responses from any terminal devices in the multicast group within the response waiting time period in the first query message, the communication device 381 releases resource R1 corresponding to that multicast group (procedure 808).

Thereby, packets addressed to the multicast group corresponding to channel CH1 are stopped from being output to the LAN, and resource R1 becomes available.

Next, as resource R1 has become available, the communication device 381 that has been waiting for resources to become available for channel CH2 reserves that resource for the multicast group corresponding to channel CH2 (procedure 809).

Thereby, the RF receiver unit 384 serving as resource R1 starts receiving channel CH2, and packets addressed to the multicast group corresponding to channel CH2 are output to the LAN. Terminal device "a" starts viewing channel CH2. As a result of this, the communication device 381 again enters a state in which there are no resources available.

Next, when a request is newly made to start viewing channel CH3 in terminal device "d" (procedure 810), terminal device "d" outputs a join message in which the address of the multicast group corresponding to channel CH3 is set (procedure 811).

The communication device 381 that has received the join message starts waiting for resources to become available and keeps waiting for a specified time period (1 second+α) (procedure 813) because no process is being executed for that multicast group and also there are no resources available (procedure 812). However, because those resources are not released within the specified time period, the request from terminal device "d" is blocked (procedure 814), and the process for that join message is terminated.

According to this sequence, a join message is not blocked immediately even when there are no resources available, making it possible for terminal devices to successively output a leave message for releasing previous resources and a join message for securing new resources.

Next, by referring to FIGS. 21 through 23B, explanations will be given for a communication resource management process based on the combination of (a), (d), (c) and (e) illustrated in FIG. 14.

Figure 21:
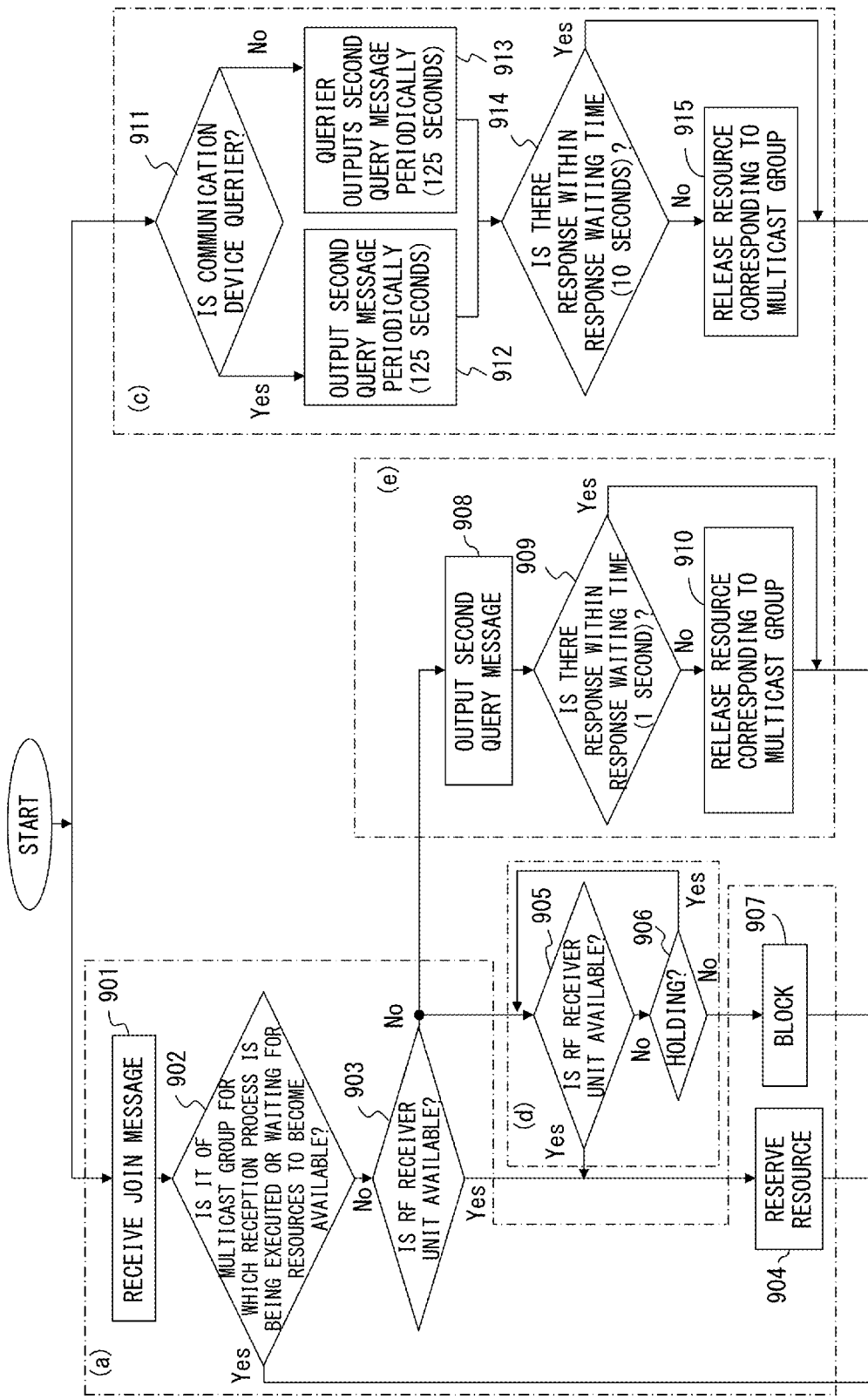
FIG. 21 illustrates a flowchart for a third communication resource management process.

FIG. 21 is a flowchart for this communication resource management process. The processes in steps 901 through 907 are similar to those in steps 501 through 507 in FIG. 17. However, the control unit 389 checks, in step 902, whether or not the address of the multicast group in a join message is the address of the multicast group for which a reception process is being executed or which is waiting for resources to become available. When the checked address is of the multicast group for which a reception process is being executed or which is waiting for resource to become available, the process for that join message is terminated.

In parallel to the processes in steps 901 through 907, the control unit 389 checks whether or not the communication device 381 serves a query router (step 911). When the communication device 381 serves as a query router, the control unit 389 periodically outputs to the LAN a second query message, addressed to all multicast group (address: 224.0.0.1), in which a response waiting time period is set (step 912). Generally, 10 seconds is set as this response waiting time period, and generally the second query message is output at intervals of 125 seconds.

When the communication device 381 does not serve as a query router, a different device that serves a query router (such as the multicast router 375) periodically outputs a second query message (step 913).

Next, the control unit 389 monitors responses from terminal devices (step 914) regardless of whether the communication device 381 serves as a query router or not, and when there are no response within the response waiting time period, the control unit 389 releases the resource that has been allocated to multicast groups that have not responded (step 915).

When there is a response within the response waiting time period, the process for the multicast group of the terminal device that transmitted the response is terminated. Accordingly, output of packets addressed to that multicast group is continued, and the corresponding resource is not released.

When there are no resources available in step 903, the control unit 389 outputs, to the LAN via the LAN output control unit 387, a second query message addressed to all multicast groups and in which a response waiting time period is set, regardless of whether the communication device 381 serves as a query router or not; this is done in parallel to the processes insteps 905 and 906 (step 908). As this response waiting time period, 1 second is set instead of the generally accepted 10 seconds, as the response time is taken into consideration.

Next, the control unit 389 monitors responses from terminal devices (step 909), and when there are no responses within the response waiting time period, the control unit 389 releases resources allocated to multicast groups that have not responded (step 910).

When there is a response within the response waiting time period, the process for the multicast group of the terminal device that has transmitted the response is terminated. Accordingly, output of packets addressed to that multicast group is continued, and the corresponding resource is not released.

It is also possible to manage communication resources by combining the processes (a), (d), and (e) instead of (a), (d), (c), and (e).

Figure 22A:
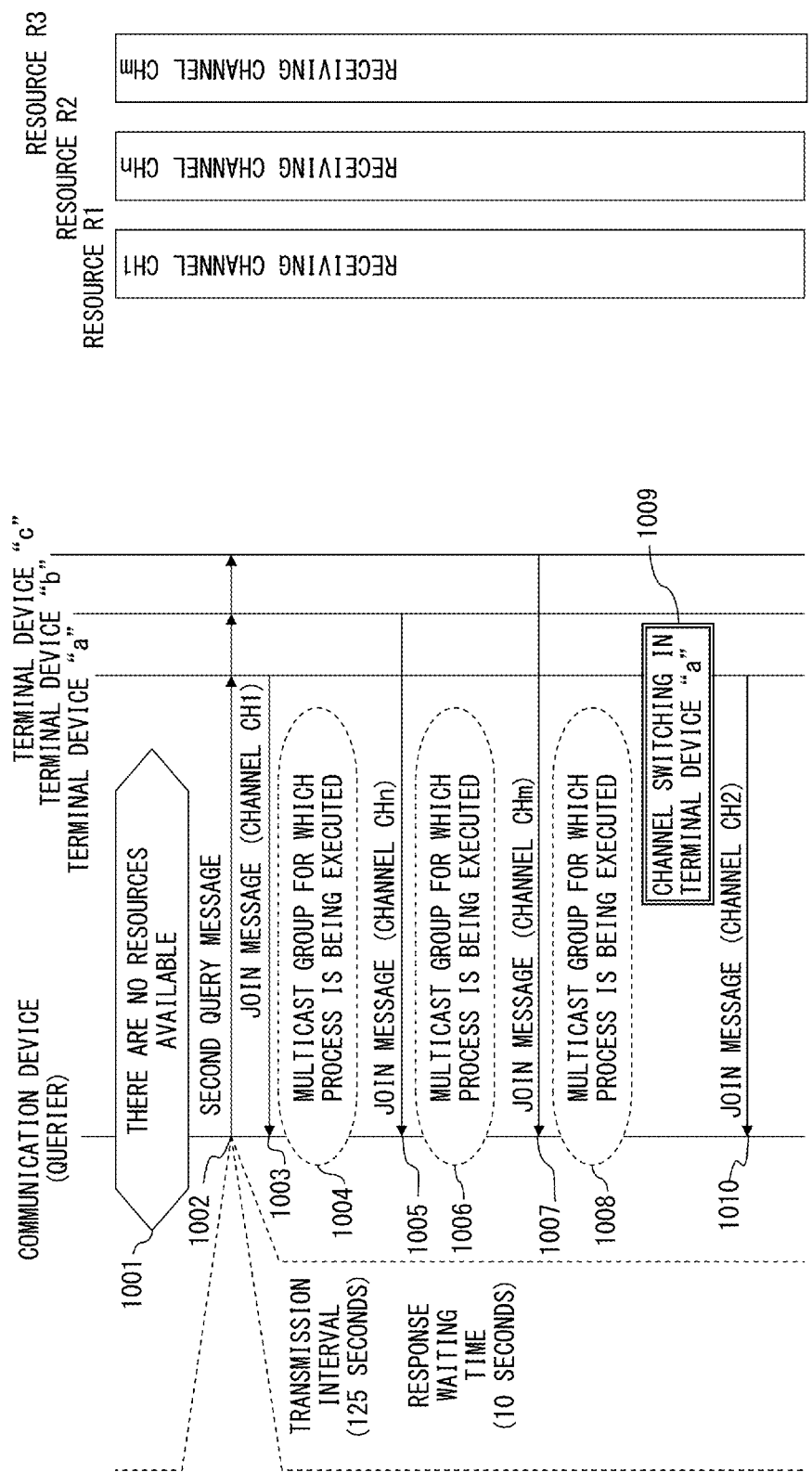
FIGS. 22A and 22B illustrate a fourth operation sequence for the communication system.
Figure 22B:
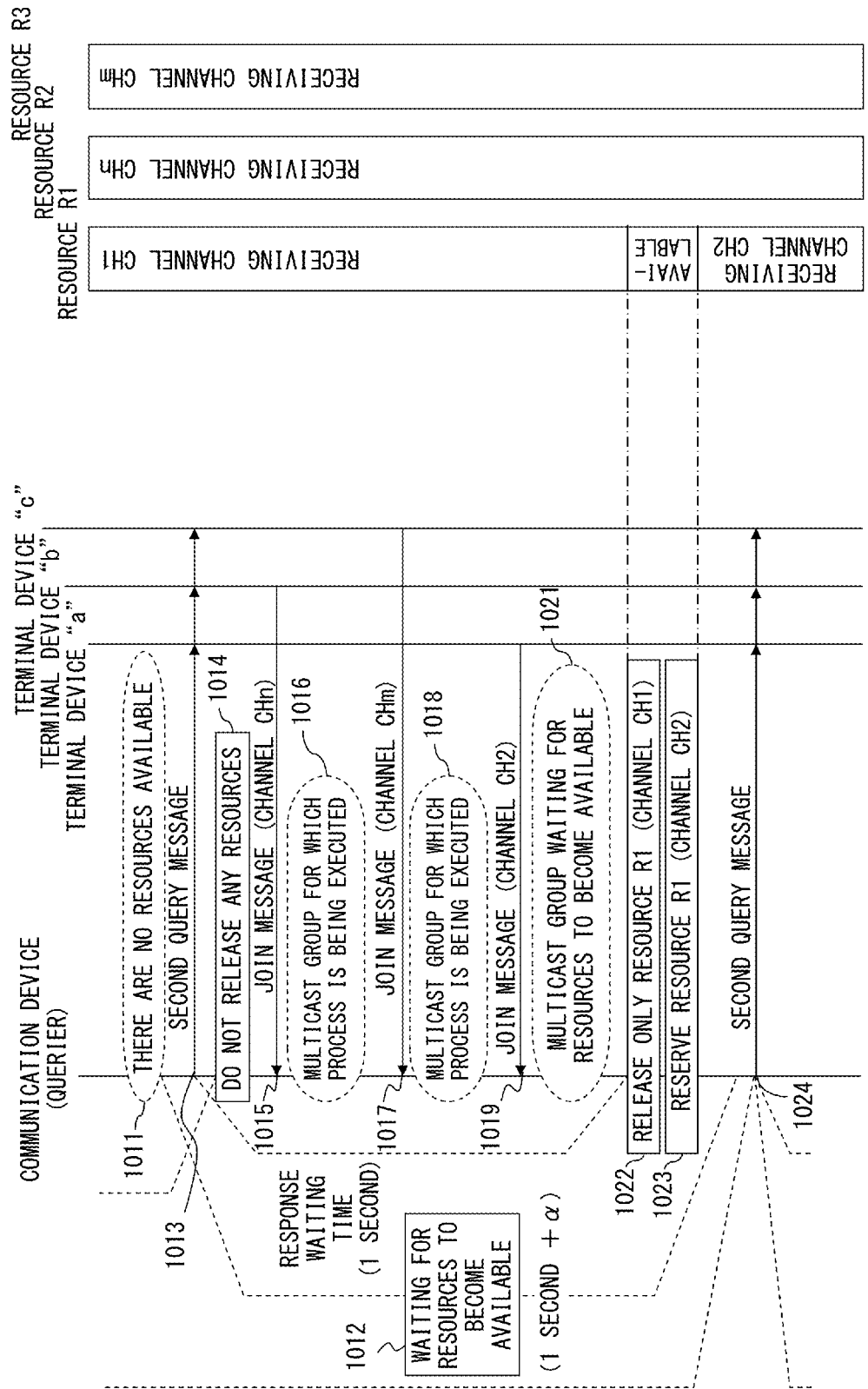

FIGS. 22A and 22B illustrate an operation sequence for switching channels to be performed when there are no resources available. In this example, similarly to the case in FIG. 20, the communication device 381 serves as a query router, terminal device "a" uses resource R1 for viewing channel CH1, terminal device "b" uses resource R2 for viewing channel CHn, and terminal device "c" uses resource R3 for viewing channel CHm.

In a state in which there are no resources available (procedure 1001), the communication device 381 periodically (at intervals of 125 seconds) outputs, to all multicast groups, a second query message in which a response waiting time period (10 seconds) is set (procedures 1002 and 1024), and monitors responses from terminal devices for the response waiting time period.

Terminal devices "a", "b", and "c" that have received the second query message output join messages in which addresses of the multicast groups corresponding to the respective channels are set so that the terminal devices can continue to view channels CH1, CHn, and CHm, respectively (procedures 1003, 1005, and 1007).

The communication device 381 that has received the respective join messages terminates the processes for these join messages because processes are being executed for all multicast groups (procedures 1004, 1006, and 1008).

When the response waiting time period for the second query message has elapsed, the communication device 381 leaves the respective resources unreleased because it has received responses from terminal devices in the multicast groups respectively corresponding to channels CH1, CHn, and CHm within the response waiting time period (procedure 1014). Accordingly, output of packets addressed to those multicast groups is continued, and resources R1 through R3 reserved for those multicast groups are not released.

When a request is made in terminal device "a" for switching from channel CH1 to channel CH2 after outputting a join message for channel CH1 (procedure 1009), terminal device "a" outputs a join message in which the address is set for the multicast group corresponding to channel CH2, for which viewing is to be started (procedure 1010).

The communication device 381 that has received that join message starts waiting for resources to become available and keeps waiting for a particular time period (1 second+α) (procedure 1012) because no process is being executed for the corresponding multicast group and there are no resources available (procedure 1011).

Also, in parallel to the above process, the communication device 381 outputs, to all multicast groups, a second query message in which a response waiting time period (1 second)

is set (procedure 1013), and monitors responses from terminal devices for the response waiting time period.

Terminal devices "a", "b", and "c" that have received the second query message output join messages respectively for channels CH2, CHn, and CHm in order to continue to view those channels (procedures 1015, 1017, and 1019).

The communication device 381 that has received the join messages for channels CHn and CHm terminates the processes for those join messages because processes are being executed for the corresponding multicast groups (procedures 1016 and 1018).

The communication device 381 that has received the join message for channel CH2 terminates the process for that join message because the corresponding multicast group is waiting for resources to become available (procedure 1021).

Because the communication device 381 has received responses from terminal devices in the multicast groups respectively corresponding to channels CHn and CHm within the response waiting time period, the communication device 381 continues to output packets addressed to those multicast groups, and does not release resources R2 and R3 allocated to those multicast groups when the response waiting time period for the second query message has elapsed.

However, because there are no responses from terminal devices in the multicast group corresponding to channel CH1, the communication device 381 releases resource R1 corresponding to that multicast group (procedure 1022).

Thereby, packets addressed to the multicast group corresponding to channel CH1 are stopped from being output to the LAN, and resource R1 becomes available.

Next, because resource R1 has become available, the communication device 381 that has been waiting for resources to become available for channel CH2 reserves that resource for the multicast group corresponding to channel CH2 (procedure 1023).

Thereby, the RF receiver unit 384 serving as resource R1 starts receiving channel CH2, and outputs, to the LAN, packets addressed to the multicast group corresponding to channel CH2. Terminal device "a" starts viewing channel CH2. As a result of this, the communication device 381 again enters a state in which there are no resources available.

According to this operation sequence, join messages are not blocked immediately even when there are no resources available, making it possible for terminal devices to output join messages for securing new resources at arbitrary timings in switching channels. Further, the time period for waiting for channel switching can be reduced to approximately 1 second from 135 seconds as the maximum length.

Figure 23A:
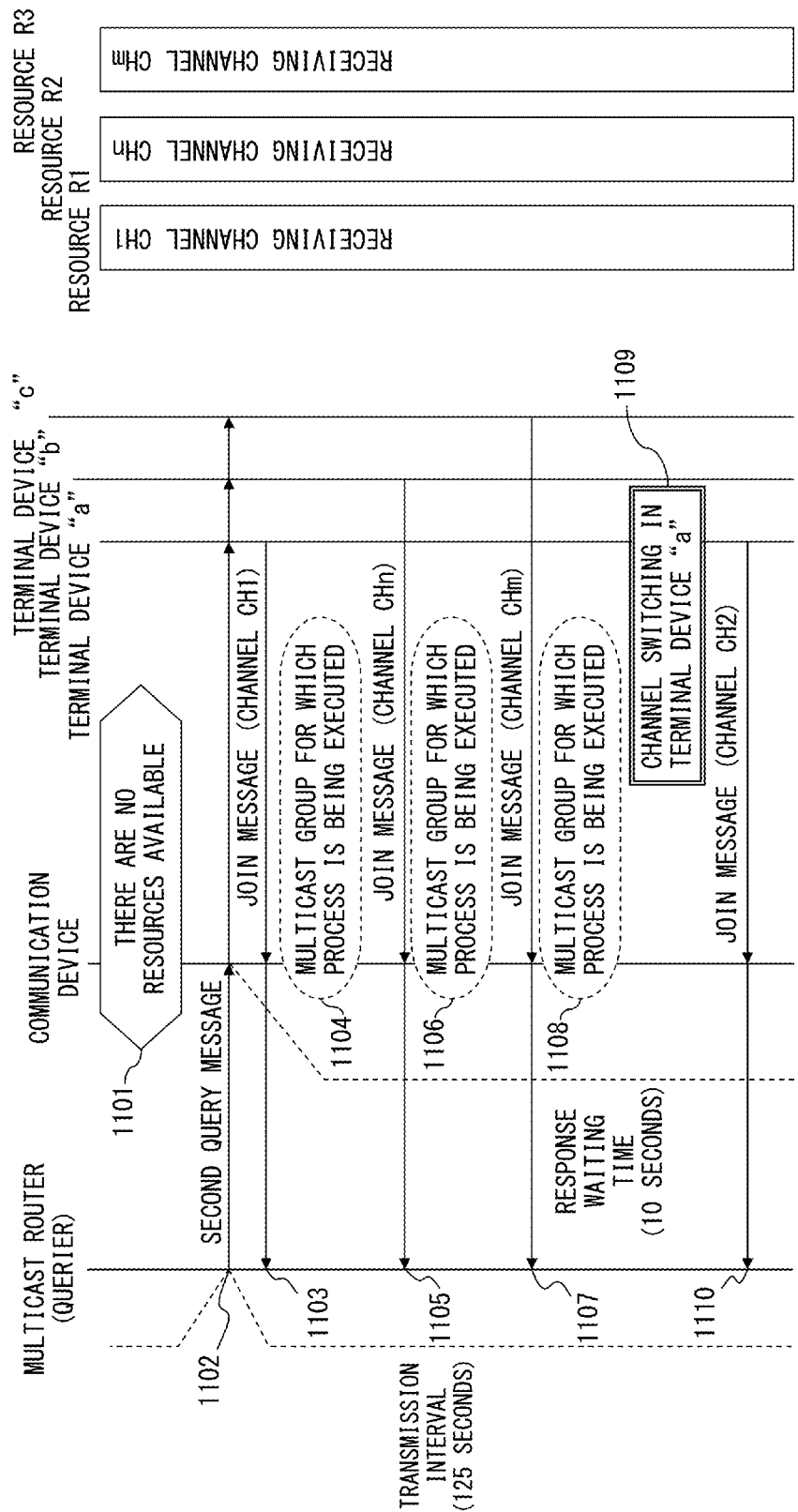
FIGS. 23A and 23B illustrate a fifth operation sequence for the communication system.
Figure 23B:
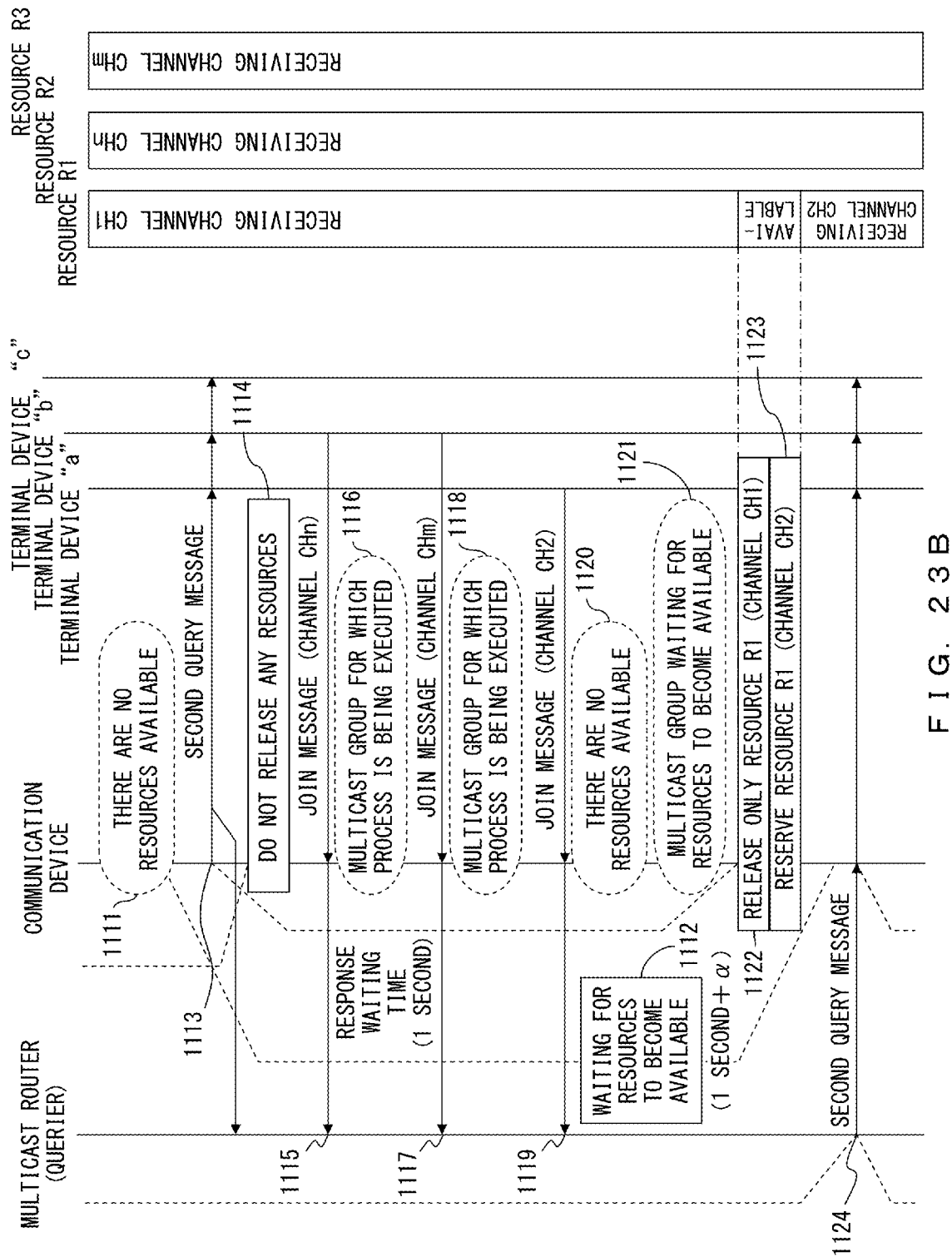

FIGS. 23A and 23B illustrate an operation sequence for switching channels to be performed when the multicast router 375 serves as a query router. This operation sequence is identical to that in FIGS. 22A and 22B except that a second query message that is periodically output is transmitted by the multicast router 375. Procedures 1101 through 1124 correspond to procedures 1001 through 1024 in FIGS. 22A and 22B, respectively.

Next, by referring to FIGS. 24 through 26, explanations will be given for a communication resource management process based on the combination of (a), (d), (b) and (e) illustrated in FIG. 14.

Figure 24:
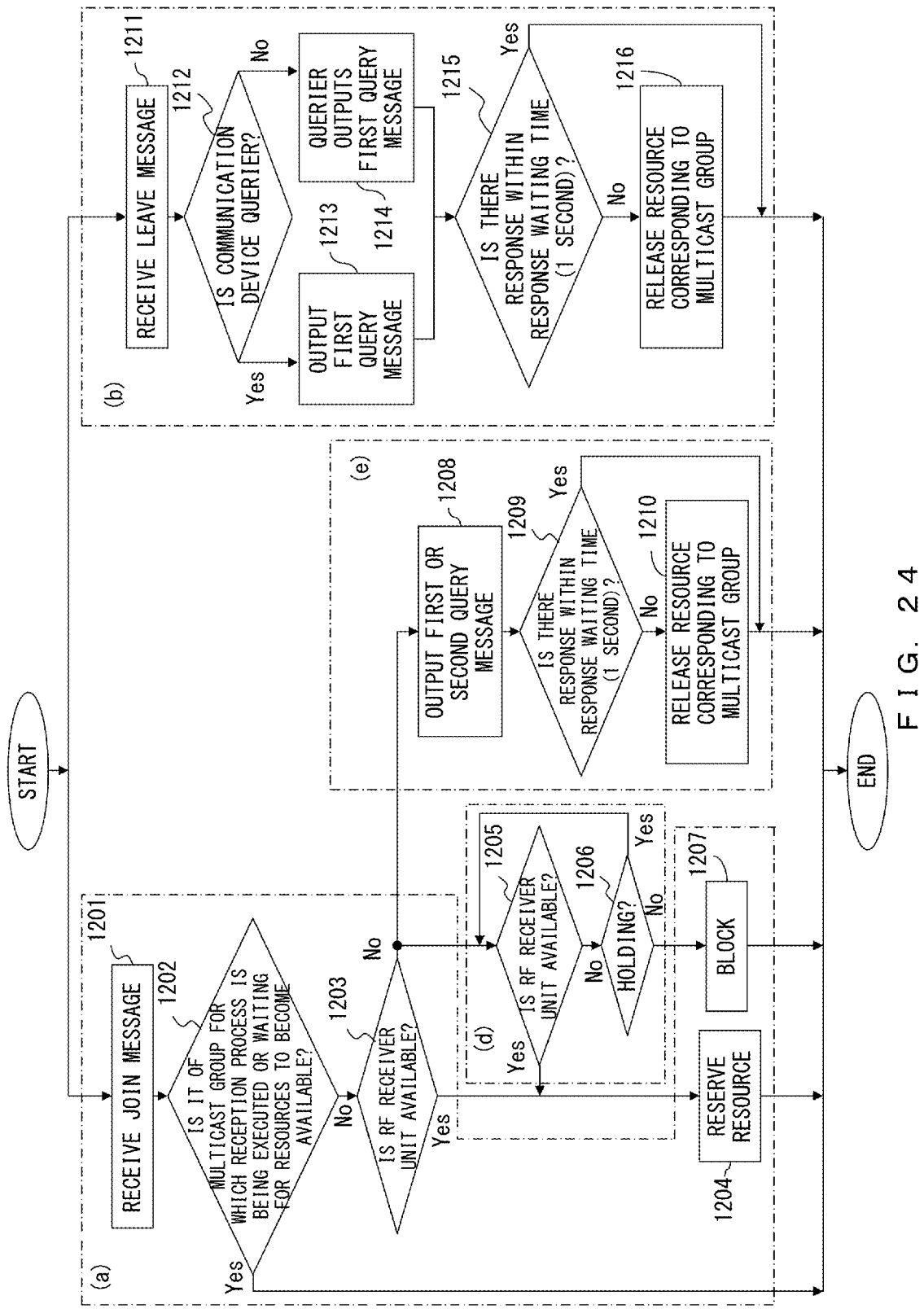
FIG. 24 illustrates a flowchart for a fourth communication resource management process.

FIG. 24 illustrates a flowchart for this communication resource management process. In this flowchart, the processes in steps 1201 through 1210 are similar to those in steps 901 through 910 in FIG. 21, and the processes insteps 1211 through 1216 are similar to those in steps 508 through 513 in FIG. 17.

However, in step 1208, the control unit 389 outputs a second query message similar to that in step 908 or outputs a plurality of first query messages. In those first query messages, the addresses of the respective multicast groups that are using resources are set and response waiting time periods are also set. As those response waiting time periods, 1 second is set. When there are no responses within the response waiting time period in a first query message, a resource allocated to the corresponding multicast group is released.

It is also possible to manage communication resources by combining the process steps of (a), (d), and (e) instead of (a), (d), (b), and (e).

Figure 25:
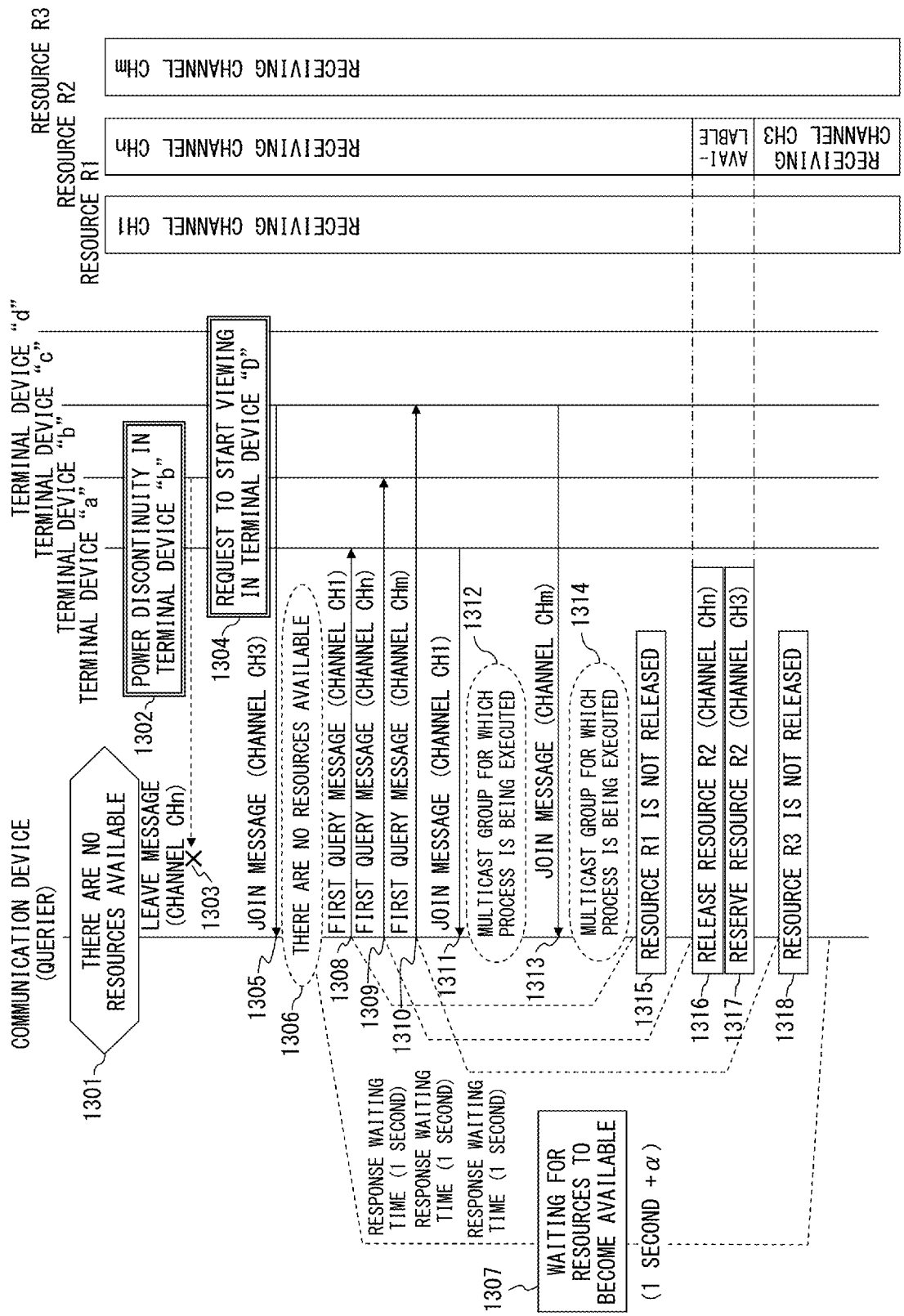
FIG. 25 illustrates a sixth operation sequence for the communication system.

FIG. 25 illustrates an operation sequence for a case in which a terminal device has terminated reception without outputting a leave message due to power discontinuity in a state of no available resources, and another terminal device newly made a request to view immediately after the termination of reception. In this example, the communication device 381 serves as a query router, terminal device "a" uses resource R1 for viewing channel CH1, terminal device "b" uses resource R2 for viewing channel CHn, and terminal device "c" uses resource R3 for viewing channel CHm.

First, the power of terminal device "b" is discontinued (procedure 1302) with no resources available (procedure 1301), and terminal device "b" terminates receiving without outputting a leave message for channel CHn (procedure 1303).

When a request to view channel CH3 is newly made in terminal device "d" (procedure 1304), terminal device "d" outputs a join message in which the address of the multicast group corresponding to channel CH3 is set (procedure 1305).

The communication device 381 that has received that join message starts waiting for resources to become available (procedure 1307) and keeps waiting for a specified time period (1 second+α) (procedure 1307) because no process is being executed for that multicast group and there are no resources available (procedure 1306).

Also, in parallel to the above process, the communication device 381 outputs, to three multicast groups respectively corresponding to channels CH1, CHn, and CHm that are using resources, three first query messages in which a response waiting time period (1 second) is set (procedures 1308, 1309, and 1310), and monitors responses for the response waiting time period.

Terminal devices "a" and "c" that received the first query messages output join messages for channels CH1 and CHm, respectively, so that they can continue to view them (procedures 1311 and 1313).

The communication device 381 that has received those join messages terminates the processes for the corresponding join messages because processes are being executed for the corresponding multicast groups (procedures 1312 and 1314).

When the response waiting time period for the first query message addressed to the multicast group corresponding to channel CH1 has elapsed, the communication device 381 does not release resource R1 (procedure 1315) because the communication device 381 has received a response from terminal device "a" in the multicast group corresponding to channel CH1 within the response waiting time period. Accordingly, output of packets addressed to that multicast group is continued, and resource R1 reserved for that multicast group is not released.

When the response waiting time period for the first query message addressed to the multicast group corresponding to channel CHm has elapsed, the communication device 381 does not release resource R3 (procedure 1318) because the communication device 381 has received a response from terminal device "c" in the multicast group corresponding to channel CHm within the response waiting time period. Accordingly, output of packets addressed to that multicast group is continued, and resource R3 reserved for that multicast group is not released.

When the response waiting time period for a first query message addressed to the multicast group corresponding to channel CHn has elapsed, the communication device 381 releases resource R2 corresponding to that multicast group (procedure 1316) because there are no responses from terminal devices in that multicast group within the waiting time period.

Thereby, packets addressed to the multicast group corresponding to channel CHn are stopped from being output to the LAN, and resource R2 becomes available.

Next, because resource R2 has become available, the communication device 381 that has been waiting for resources to become available for channel CH3 reserves resource R2 for the multicast group corresponding to channel CH3 (procedure 1317).

Thereby, the RF receiver unit 384 serving as resource R2 starts receiving channel CH3, and packets addressed to the multicast group corresponding to channel CH3 are output to the LAN. Then, terminal device "d" starts viewing channel CH3. As a result of this, the communication device 381 again enters a state where there are no resources available.

It is also possible for the communication device 381 to wait for a response only to the first query message that was transmitted last instead of waiting for responses to the respective first query messages. In such a case, when there is no response within the response waiting time period to the first query message that was transmitted last, the resource allocated to the corresponding multicast group that has given no responses are released.

This operation sequence promotes release of resources that are left in a reserved state, as a leave message is not output due to power discontinuity, and makes it possible to allocate those resources to new resource acquisition requests.

Figure 26:
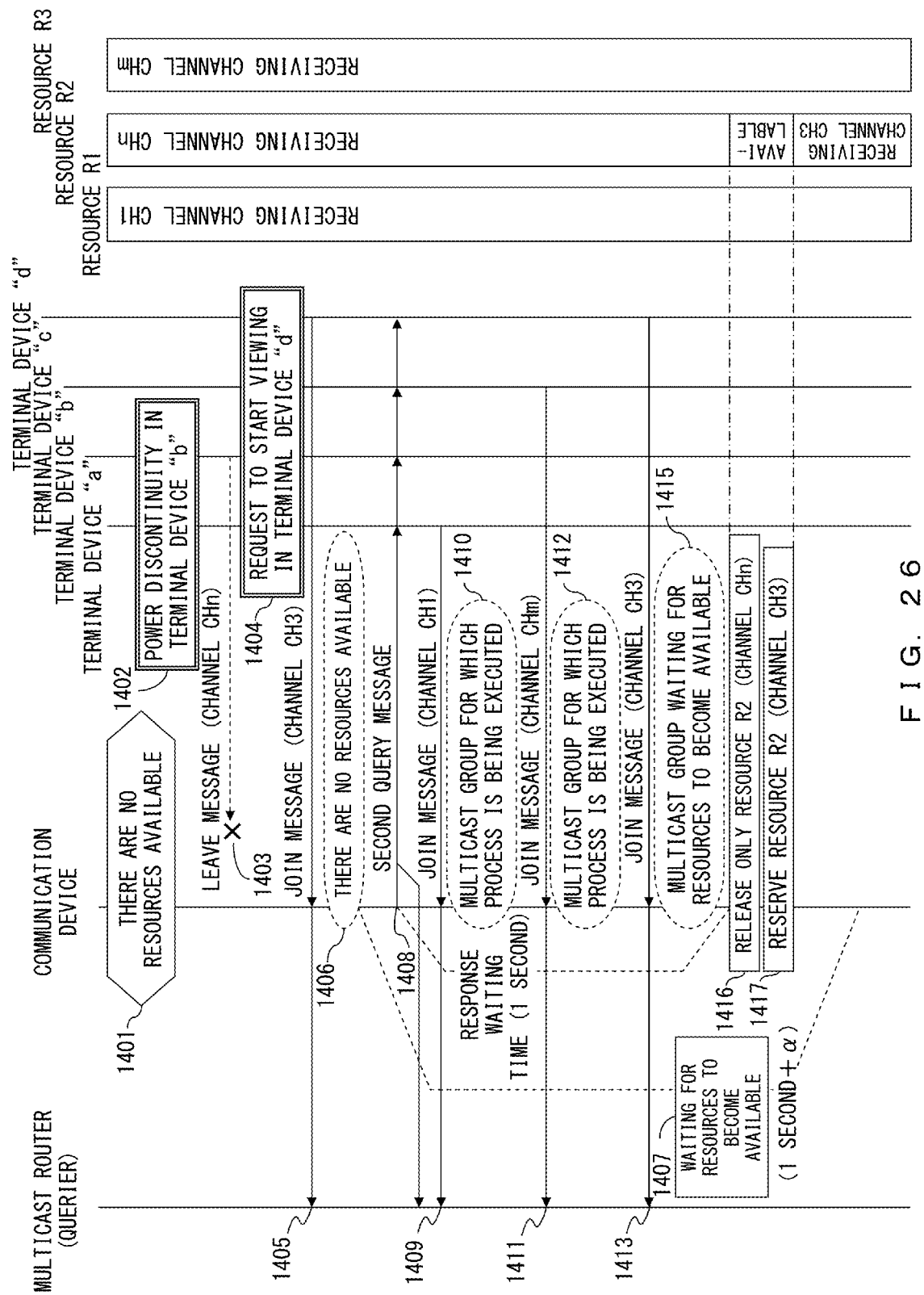
FIG. 26 illustrates a seventh operation sequence for the communication system.

FIG. 26 illustrates an operation sequence to be performed when a second query message is used instead of a first query message in the operation sequence illustrated in FIG. 25. However, it is assumed in this example that the multicast router 375 serves as a query router. Procedures 1401 through 1407, 1409 through 1412, 1416, and 1417 correspond to procedures 1301 through 1307, 1311 through 1314, 1316, and 1317, respectively.

In parallel to waiting for resources to become available in procedure 1407, the communication device 381 outputs a second query message (procedure 1408). There is only one second query message, there is only one response waiting time period for that message too, and all multicast groups are targets of the query.

Accordingly, not only terminal devices "a" and "c" but also terminal device "d" outputs a join message for channel CH3 in order to continue viewing channel CH3 (procedure 1413).

The communication device 381 that has received the join message terminates the process for that join message because the corresponding multicast group is waiting for resources to become available (procedure 1415).

In the table illustrated in FIG. 16, frequencies of broadcast waves and the addresses (channels) of multicast groups are stored in a one-to-one relationship. However, it is also possible to broadcast plural channels using one frequency. In such a case, addresses of plural multicast groups corresponding to each of the frequencies are registered in the table 388.

Figure 27A:
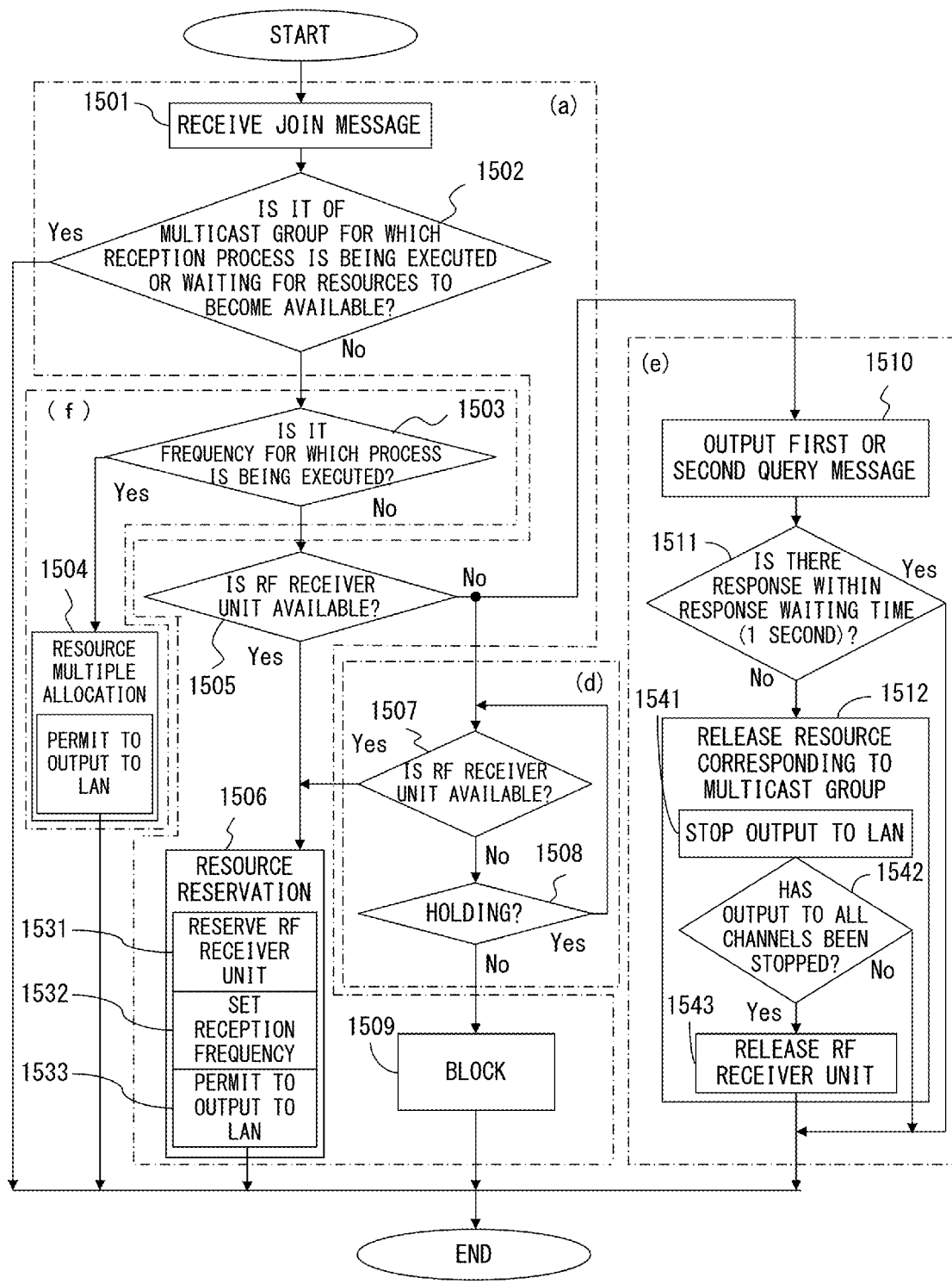
FIGS. 27A and 27B illustrate a flowchart for a fifth communication resource management process.
Figure 27B:
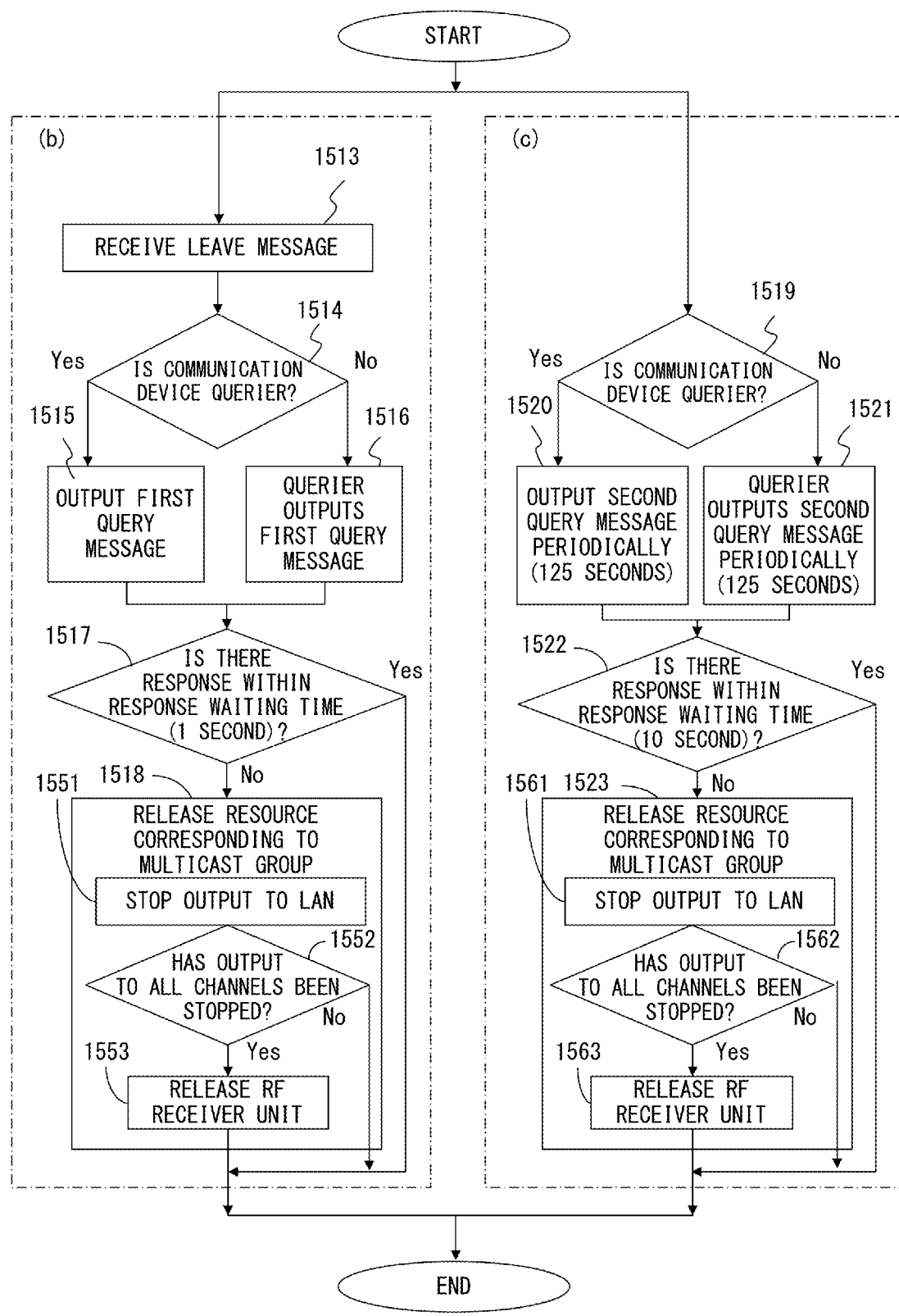

FIGS. 27A and 27B are a flowchart for a communication resource management process for a communications system as described above. The processes in steps 1501, 1502, 1505 through 1511, and 1513 through 1517 are similar to those in steps 1201 through 1209, and 1211 through 1215 in FIG. 24. The processes in steps 1519 through 1522 are similar to those in steps 911 through 914 in FIG. 21. However, (f) resource multiple allocation process is performed between steps 1502 and 1505 in (a) resource reservation process in FIG. 27A.

When the address of a multicast group in a join message is not of a multicast group that is performing a reception process or waiting for resources to become available in step 1502, (f) resource multiple allocation process is executed.

In such a case, the control unit 389 searches the table 388 to retrieve a reception frequency corresponding to the address of the multicast group in the join message, and confirms whether that reception frequency is identical to the frequency for which the reception process is being executed (step 1503). When the retrieved frequency is identical to the frequency for which the reception process is being executed, a resource multiple allocation is performed (step 1504). In this process, the LAN output control unit 387 is permitted to output packets addressed to that multicast group. When the retrieved frequency is not identical to the frequency for which the reception process is being executed, the processes in and after step 1505 are executed.

In step 1506, the available RF receiver unit 384 is allocated to that multicast group (step 1531). Next, the reception frequency corresponding to the address of that multicast group is retrieved from the table 388, and the retrieved frequency is set in the RF receiver unit 384 (step 1532). Thereafter, the LAN output control unit 387 is permitted to output packets addressed to that multicast group (step 1533).

In step 1512, the control unit 389 instructs the LAN output control unit 387 to stop outputting packets addressed to a multicast group from which responses are not received (step 1541). Next, the control unit 389 refers to the table 388 in order to obtain the addresses of all multicast groups that use the same reception frequency as that multicast group uses, and checks whether or not output of packets addressed to those multicast groups has been stopped in the LAN output control unit 387 (step 1542).

When output of packets addressed to those multicast groups has been stopped, the control unit 389 releases the RF receiver unit 384 that has been reserved for those multicast groups (step 1543). When output of packets to at least one of such multicast groups has continued, the control unit 389 does not release the RF receiver unit 384, and terminates the process.

The processes in steps 1551 through 1553 executed in step 1518, and steps 1561 through 1563 executed in step 1523 are similar to steps 1541 through 1543.

Figure 28A:
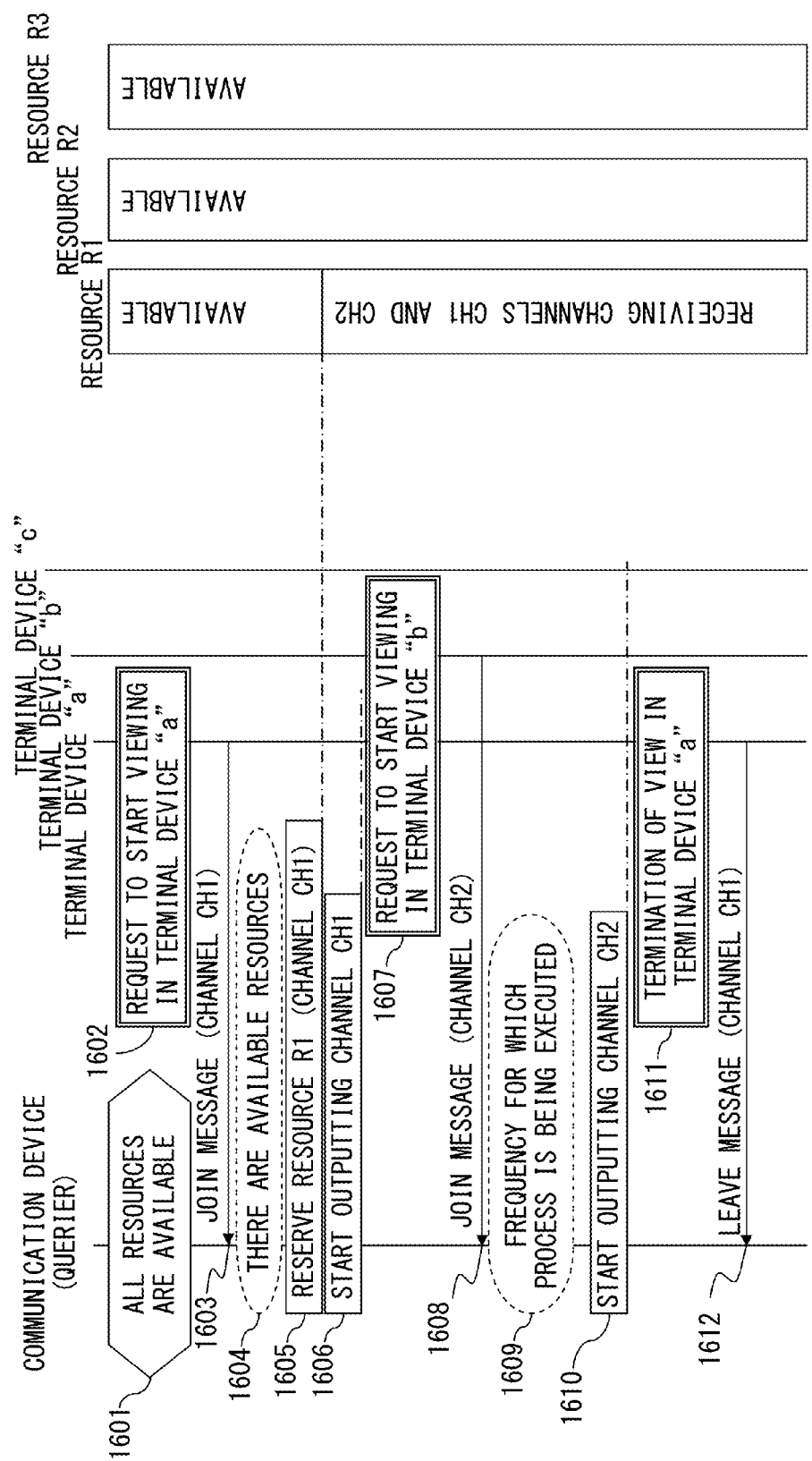
FIGS. 28A and 28B illustrate an eighth operation sequence for the communication system.
Figure 28B:
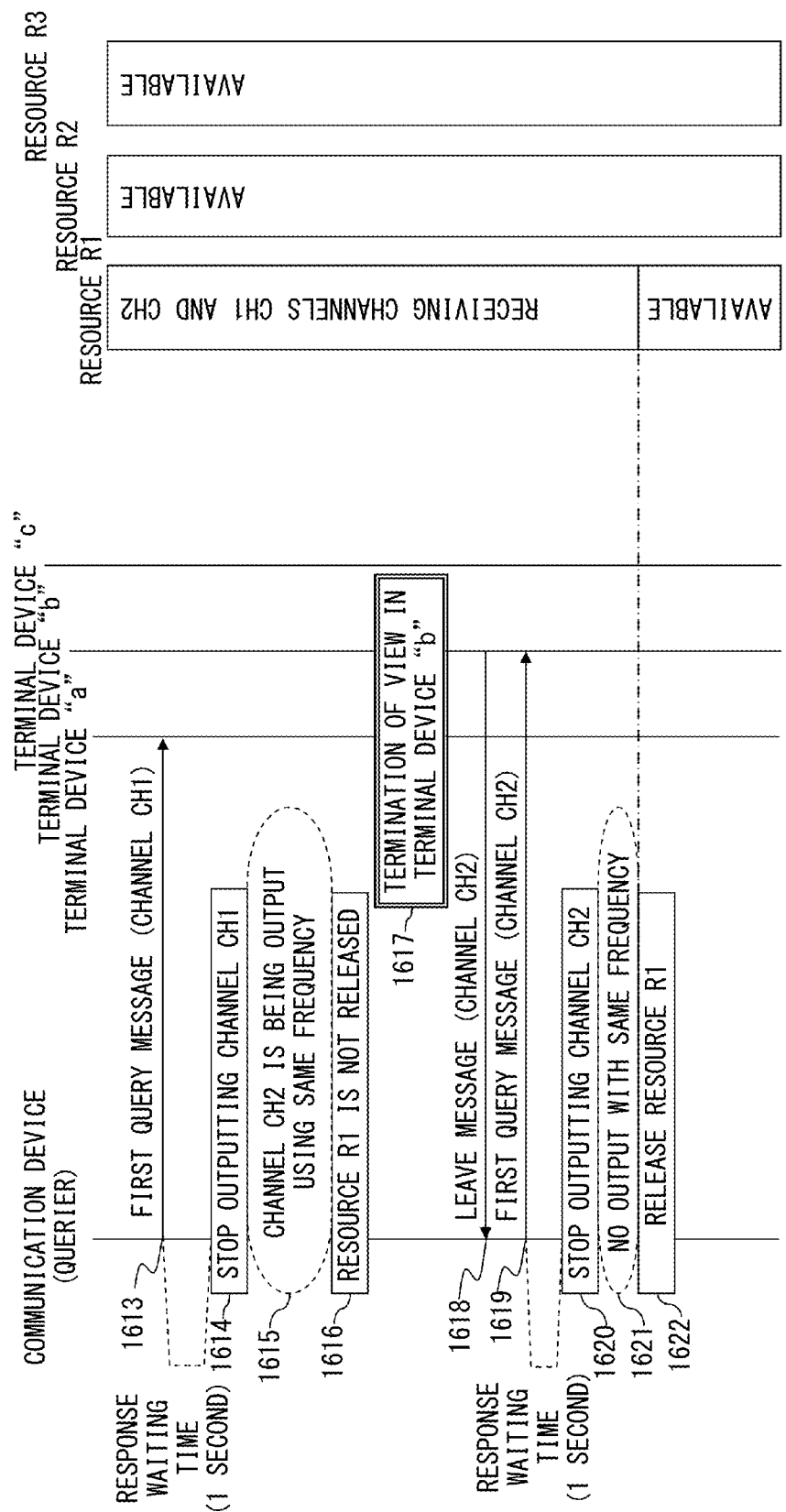

FIGS. 28A and 28B illustrate an operation sequence performed when plural channels are covered by the same frequency, and two terminal devices are each viewing different channels. In this example, the communication device 381 serves as a query router, and channels CH1 and CH2 are accommodated by one frequency.

When terminal device "a" makes a request to start viewing channel CH1 (procedure 1602) with all resources being available (procedure 1601), terminal device "a" outputs a join message for channel CH1 (procedure 1603).

The communication device 381 that has received that join message reserves resource R1 for the corresponding multicast group (procedure 1605) because no process is being executed for the multicast group or the frequency of channel CH1 and there are resources available (procedure 1604).

The frequency of channel CH1 accomodates channels CH1 and CH2, and accordingly the RF receiver unit 384 serving as resource R1 starts receiving those channels. However, only packets addressed to the multicast group corresponding to channel CH1 are output to the LAN (procedure 1606). Thereby, terminal device "a" starts viewing channel CH1.

When terminal device "b" makes a request to start viewing channel CH2 (procedure 1607), terminal device "b" outputs a join message for channel CH2 (procedure 1608).

The communication device 381 that has received that join message starts outputting packets addressed to the corresponding multicast group (procedure 1610) because no process is being executed for the multicast group of channel CH2 and a process is being executed for the frequency of channel CH2 (procedure 1609).

Thereby, packets for channels CH1 and CH2 are output to the LAN, and terminal device "b" starts viewing channel CH2.

Next, when terminal device "a" terminates viewing of channel CH1 (procedure 1611), terminal device "a" outputs a leave message for channel CH1 to all multicast routers (procedure 1612).

The communication device 381 that has received that leave message, as the communication device 381 itself serving as a query router, outputs a first query message to that multicast group (procedure 1613), and monitors responses from terminal devices for the response waiting time period (1 second) set in the first query message.

Because there are no responses from terminal devices in that multicast group within the response waiting time period, the communication device 381 stops output of packets addressed to that multicast group (procedure 1614). However, the communication device 381 does not release resource 1R1 (procedure 1616) because packets for channel CH2 using the same frequency are being output (procedure 1615) and resource 1R1 reserved for channel CH1 is being used for channel CH2.

When terminal device "b" terminates viewing of channel CH2 (procedure 1617), terminal device "b" outputs a leave message for channel CH2 to all multicast routers (procedures 1618).

The communication device 381 that has received that leave message, as the communication device 381 itself serving as a query router, outputs a first query message to the corresponding multicast group (procedure 1619), and monitors responses from terminal devices for the response waiting time period (1 second) set in the first query message.

Because there are no responses from terminal devices in that multicast group within the response waiting time period, the communication device 381 stops output of packets addressed to that multicast group (procedure 1620). Also, the communication device 381 releases resource R1 (procedure 1622) because output of packets addressed to all channels using the same frequency has been stopped (procedure 1621) and no other channels are using resource R1.

Thereby, output to the LAN, of packets addressed to the multicast group corresponding to channel CH2 is stopped, making resource R1 available.

According to this operation sequence, one and the same RF receiver unit 384 can be used for plural channels at the same time when plural channels are accommodated by one and the same frequency.

In the above embodiments, the RF receiver units 384 in the communication device 381 is managed as communication resources. However, what is to be managed is not limited to the RF receiver unit 384. For example, the communication resource management can also be applied to communication resources (band resources) in which a blockage can be caused due to the need to ensure band for QoS (Quality of Service) in LANs, or can be applied to finite resources such as the conversion unit 385 in the communication device 381, etc.

In addition, messages exchanged between the communication device and terminal devices are not limited to IGMP messages according to IPv4 (Internet Protocol Version 4), which have been used for channel selection in the above embodiments. Instead of IGMP, other protocols can be used, such as MLD (Multicast Listener Discovery: RFC 2710) or RSVP (Resource Reservation Protocol: RFC 2205) defined by IPv6 (Internet Protocol Version 6). When using RSVP, the resource acquisition request, the resource releasing request, and the resource-use-continuation confirmation in FIG. 14 correspond to a Resv message, ResvTear message and PATH message, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device for receiving a broadcast signal and transmitting the broadcast signal to a plurality of terminal devices, the communication device comprising:
    a plurality of communication resources used for receiving or transmitting the broadcast signal;
    a resource releasing device configured to release a communication resource that has ceased to be used, among the plurality of communication resources;
    a receiving device configured to receive a resource acquisition request from one of the plurality of terminal devices;
    a resource allocation device configured to check whether a first multicast group indicated by the resource acquisition request corresponds to a second multicast group for which a reception process is being executed or a third multicast group that is waiting for a communication resource to be available, to check whether or not there is an available communication resource when the first multicast group does not correspond to the second multicast group nor the third multicast group, and to allocate an available communication resource to the first multicast group; and
    an available resource waiting device configured to hold the resource acquisition request temporarily and to wait for release of a communication resource being used when the plurality of communication resources are being used and there is not an available resource.

2. The communication device according to claim 1, further comprising:
    a transmission device configured to transmit a resource-use-continuation confirmation to a terminal device that is using a communication resource when there is not an available communication resource, wherein:
    the resource releasing device releases a communication resource being used when there is not a response to the resource-use-continuation confirmation.

3. The communication device according to claim 2, wherein:
    the resource releasing device releases a communication resource being used when there is not a response to another resource-use-continuation confirmation transmitted periodically to a terminal device that is using the communication resource.

4. The communication device according to claim 2, wherein:
the receiving device receives a resource releasing request from one of the plurality of terminal devices, and the resource releasing device releases a communication resource specified by the resource releasing request when there is not a response to another resource-use-continuation confirmation transmitted to a terminal device that is using the communication resource specified by the resource releasing request.

5. The communication device according to claim 1, wherein:
the receiving device receives a resource releasing request from one of the plurality of terminal devices, and the resource releasing device releases a communication resource specified by the resource releasing request when there is not a response to a resource-use-continuation confirmation transmitted to a terminal device that is using the communication resource specified by the resource releasing request.

6. The communication device according to claim 1, wherein:
the plurality of communication resources are a plurality of radio receiving devices configured to receive the broadcast signal from a broadcasting network, and the receiving device receives the resource acquisition request from one of the plurality of terminal devices via a multicast compatible network.

7. A method of managing communication resources in a communication device for receiving a broadcast signal and transmitting the broadcast signal to a plurality of terminal devices, the method comprising:
receiving a resource acquisition request from one of the plurality of terminal devices;
checking whether a first multicast group indicated by the resource acquisition request corresponds to a second multicast group for which a reception process is being executed or a third multicast group that is waiting for a communication resource to be available;
checking, when the first multicast group does not correspond to the second multicast group nor the third multicast group, whether or not there is an available resource among a plurality of communication resources used for receiving or transmitting the broadcast signal;
holding the resource acquisition request temporarily and waiting for release of a communication resource being used when the plurality of communication resources are being used and there is not an available resource;
releasing a communication resource that has ceased to be used, among the plurality of communication resources; and
allocating the released communication resource to the first multicast group indicated by the resource acquisition request that has been held.

8. The method of managing communication resources according to claim 7, wherein:
when there is not an available communication resource, a resource-use-continuation confirmation is transmitted to a terminal device that is using a communication resource, and when there is not a response to the resource-use-continuation confirmation, a communication resource being used is released.

* * * * *